US008214430B2

(12) United States Patent
Murakami et al.

(10) Patent No.: US 8,214,430 B2
(45) Date of Patent: Jul. 3, 2012

(54) NETWORK IMAGE PROCESSING SYSTEM, NETWORK IMAGE PROCESSING APPARATUS, AND NETWORK IMAGE PROCESSING METHOD

(75) Inventors: Masakazu Murakami, Itami (JP); Hironobu Nakata, Itami (JP); Kazumi Sawayanagi, Itami (JP); Minako Kobayashi, Ikeda (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 911 days.

(21) Appl. No.: 11/325,313

(22) Filed: Jan. 5, 2006

(65) Prior Publication Data

US 2007/0055741 A1 Mar. 8, 2007

(30) Foreign Application Priority Data

Sep. 5, 2005 (JP) ................................ 2005-256250

(51) Int. Cl.

| | |
|---|---|
| ***G06F 15/16*** | (2006.01) |
| ***G06F 17/00*** | (2006.01) |
| ***G06F 17/20*** | (2006.01) |
| ***G06F 3/00*** | (2006.01) |
| ***G05B 11/01*** | (2006.01) |

(52) U.S. Cl. .............. 709/204; 700/17; 700/19; 700/90; 709/201; 709/202; 709/203; 709/205; 709/206; 709/208; 715/200; 715/211; 715/229; 715/704; 715/751; 715/753

(58) Field of Classification Search .................. 709/238, 709/201–206, 208; 715/500, 530, 200, 211, 715/229, 704, 751, 753; 700/17, 19, 90

See application file for complete search history.

(56) References Cited

U.S. PATENT DOCUMENTS

| | | | | |
|---|---|---|---|---|
| 5,530,757 | A | 6/1996 | Krawczyk | |
| 5,938,732 | A * | 8/1999 | Lim et al. | 709/229 |
| 5,966,512 | A * | 10/1999 | Bates et al. | 709/205 |
| 6,003,011 | A | 12/1999 | Sarin et al. | |
| 6,026,305 | A | 2/2000 | Salinger et al. | |
| 6,401,073 | B1 * | 6/2002 | Tokuda et al. | 705/8 |
| 6,860,422 | B2 | 3/2005 | Hull et al. | |
| 6,868,424 | B2 | 3/2005 | Jones et al. | |
| 2002/0174322 | A1 * | 11/2002 | Kruckemyer | 712/218 |
| 2004/0205065 | A1 * | 10/2004 | Petras et al. | 707/5 |
| 2004/0205653 | A1 * | 10/2004 | Hadfield et al. | 715/530 |

(Continued)

FOREIGN PATENT DOCUMENTS

JP 08-016104 1/1996

(Continued)

OTHER PUBLICATIONS

Notification of Reasons for Refusal in JP 2005-256250 dated Jun. 24, 2008, and English Translation thereof.

*Primary Examiner* — Ashok Patel
*Assistant Examiner* — Kevin Bechtel
(74) *Attorney, Agent, or Firm* — Buchanan Ingersoll & Rooney PC

(57) ABSTRACT

Network image processing apparatuses constituting a network image processing system display, in list form, a document in units of action. When a user selection is received, a script that defines document handling is remanded to an apparatus that executed an action corresponding to the user selection.

12 Claims, 24 Drawing Sheets

U.S. PATENT DOCUMENTS

| | | | | |
|---|---|---|---|---|
| 2004/0230892 | A1* | 11/2004 | Horton | 715/511 |
| 2004/0268103 | A1* | 12/2004 | Shelor | 712/244 |

FOREIGN PATENT DOCUMENTS

| | | | |
|---|---|---|---|
| JP | 09034948 | * | 2/1997 |
| JP | 9-081488 | A | 3/1997 |
| JP | 2000-082103 | | 3/2000 |
| JP | 2000-200171 | | 7/2000 |
| JP | 2002-109166 | | 4/2002 |
| JP | 2002-215856 | | 8/2002 |
| JP | 2003-242313 | | 8/2003 |
| JP | 2003-345954 | A | 12/2003 |
| JP | 2004-192261 | | 7/2004 |
| JP | 2004-280665 | A | 10/2004 |

* cited by examiner

```
<name>  Pamphlet Creation </name>
<No>1004</No>
<sequence>
 <action1>
  <mode>Scan</mode>
  <who>USER-A</who>
  <where>150.16.80.1</where>
  <destination>
   <document destination>150.16.80.21</document destination>
   <script destination>150.168.80.20</script destination>
  </destination>
  <comment></comment>
 </action1>
  ........................
 <action 4 >
  ........................
 </action 4 >
</sequence>

<history>
 <action1>
  <image name>document1 </image name>
  <whose action>USER-A</whose action>
  <when>2005/8/8 8:30</when>
  <where>150.16.80.10</where>
 </action1>
 <action2>
  ........................
  <where>150.16.80.20</where>
  <where terminal>150.16.80.21</where terminal>
  ........................
 </action2>
 <action3>
  ........................
 </action3>
</history>

<back to>
 <from>150.16.80.40</from>
 <to>150.16.80.20</to>
 <whose comment>USER-D</whose comment>
 <attached file name>D's comment</attached file name>
</back to>
```

3a

3b

3c

6

NETWORK IMAGE PROCESSING SYSTEM, NETWORK IMAGE PROCESSING APPARATUS, AND NETWORK IMAGE PROCESSING METHOD

This application is based on application No. 2005-256250 filed in Japan, the content of which is hereby incorporated by reference.

BACKGROUND OF INVENTION

1. Field of the Invention

The present invention relates to a network image processing system in which a plurality of networked apparatuses cooperate to execute a process definition described in a workflow script, and in particular to a technique for improving user-friendliness when an action needs to be remanded to an upstream apparatus in a flow.

2. Related Art

In conventional workflow systems, workers use apparatuses such as MFPs (Multi Function Peripheral) or PCs on a network to complete a target document.

In such systems, workers manually specify a forwarding address, etc. for the document when their assigned task is finished, and the document is transferred to the next worker.

Japanese Patent Application Publication No. 09-081488 discloses a structure which automates transfer processing by appending data regarding a defined circulation route to the document to be circulated, thereby freeing workers in the flow from the chore of specifying the forwarding address, etc.

If a worker in the flow discovers an error (mistake) in the document, however, the worker may want to remand a task stage to a worker responsible for the error.

According to the prior art, the worker who wants to give a remand instruction (hereinafter, "remand-instruction agent") needs to manually perform a two-step process of (1) designating the worker responsible for the error and (2) remanding the document, etc. to the designated worker (to the apparatus used by the worker) in such a case.

It is especially troublesome to designate the worker responsible for the error if many workers are collaborating on the document and a large number of the workers are upstream of the remand-instruction agent. If the document were remanded to the wrong task stage, this may cause a back up in processing.

SUMMARY OF INVENTION

In view of the above issue, an object of the present invention is to provide a network image processing system, network image processing apparatus, and network image processing method that, in a case of remanding a task stage, are able to designate the task stage to be remanded more easily than the prior art, and easily perform a remand to the appropriate task stage.

In the network image processing system pertaining to the present invention, a plurality of networked apparatuses execute actions on a processing target document transmitted and received between the apparatuses, each of the apparatuses including a display unit operable to display, in list form, the document in units of action; a reception unit operable to receive, from an authorized user, a selection from the displayed document list; and a remand unit operable to remand the document to an apparatus that executed an action corresponding to the selection.

The network image processing apparatus pertaining to the present invention is included in a network image processing system in which a plurality of the network image processing apparatuses that are networked execute actions on a processing target document transmitted and received between the apparatuses, the network image processing apparatus including a display unit operable to display, in list form, the document in units of action; a reception unit operable to receive, from an authorized user, a selection from the displayed document list; and a remand unit operable to remand the document to an apparatus that executed an action corresponding to the selection.

The network image processing method pertaining to the present invention is used in a network image processing system in which a plurality of networked apparatuses execute actions on a processing target document transmitted and received between the apparatuses, the networking image processing method including the steps of displaying, in list form, the document in units of action; receiving, from an authorized user, a selection from the displayed document list; and remanding the document to an apparatus that executed an action corresponding to the selection.

According to these structures, a document is displayed, in list form, in units of action, thereby enabling a remand-instruction agent, who wants to perform a remand for a reason such as finding an error, to easily judge at which stage of action (task stage) the error arose. When the remand-instruction agent selects a document from the displayed list, the document is remanded to an apparatus that generated the document, thereby enabling a simple remand to the appropriate task stage.

In the network image processing system, each of the apparatuses may further include a script transmission/reception unit operable to transmit and receive a script that defines document handling, the script including actions which indicate document processing content, sequence information which indicates an execution sequence of the actions, and apparatus information which specifies the apparatuses to which the actions are assigned; an execution unit operable to execute an assigned action on a document received from an apparatus that executed a prior action according to the sequence information, to generate a document; a script addition unit operable to add, to the script, location information that indicates the apparatus in correspondence with the generated document; and a transfer unit operable to transfer the generated document, after appending the received document, to an apparatus that is to execute a subsequent action according to the sequence information.

In the network image processing system, the transfer unit may transfer the script with the document to the apparatus that is to execute a subsequent action according to the sequence information.

In the network image processing system, the script addition unit may add, to the script, remand information indicating a remand of the script, and each of the apparatuses may further include a cancel instruction unit operable, if the remand information is included in the script, to transmit, to the apparatus that is to execute a subsequent action according to the sequence information, a cancel instruction which instructs cancellation of action execution.

According to this structure, it is possible to prevent the execution of actions on a document that includes an error from being continued in a different branch from the remand-source, for example.

In the network image processing system, the script may include information indicating a split at a predetermined point in the execution sequence indicated by the sequence information; the script addition unit may add information specifying a remand-source apparatus to the script; each of the apparatuses may further include a position judgment unit operable to judge, based on the apparatus information and the sequence information included in the script, whether the apparatus is positioned at the predetermined point; and if the judgment is affirmative, the cancel instruction unit may transmit the cancel instruction to an apparatus that is to execute a subsequent action according to the sequence information and is on a different branch from the remand-source apparatus.

In the network image processing system, the actions may include a manual action requiring a user operation; the script may include address information specifying an address of a user in charge of the manual action; and each of the apparatuses may further include a notification unit operable, if the script includes the remand information and the assigned action is the manual action, to send, to the address specified in the address information included in the script, a notification of the remand.

Generally, a user who finishes their task will tend to have little interest in the progress of subsequent tasks. According to this structure, the user-in-charge can be expected to quickly re-execute their task by sending a notification of the remand.

In the network image processing system, the network image processing system may include a terminal apparatus that assists in execution of the actions assigned to the apparatuses; and the script addition unit may add, after action execution, location information indicating the terminal apparatus that assisted in execution of the action to the script.

In the network image processing system, the script may be in XML format.

According to this structure, it is possible to increase the extensibility of the script.

The network image processing apparatus pertaining to the present invention, may further include a script transmission/reception unit operable to transmit and receive a script that defines document handling, the script including actions which indicate document processing content, sequence information which indicates an execution sequence of the actions, and apparatus information which specifies the apparatuses to which the actions are assigned; an execution unit operable to execute an assigned action on a document received from an apparatus that executed a prior action according to the sequence information, to generate a document; a script addition unit operable to add, to the script, location information that indicates the apparatus in correspondence with the generated document; and a transfer unit operable to transfer the generated document, after appending the received document, to an apparatus that is to execute a subsequent action according to the sequence information.

Also, the actions may include a manual action requiring a user operation, the script may include user-in-charge information specifying a user in charge of the manual action, and the network image processing apparatus may further include a storage unit operable to store address information per user; and a notification unit operable, if the script is remanded from an apparatus that is to execute a subsequent action according to the sequence information and the assigned action is the manual action, to send, to the user in charge of the manual action at an address indicated in the address information, a notification of the remand.

According to this structure, it is possible to prompt the user-in-charge to re-execute the action.

Also, the script may include information indicating a split at a predetermined point in the execution sequence indicated by the sequence information, and the network image processing apparatus may further include a position judgment unit operable to judge, based on the apparatus information and the sequence information included in the script, whether the network image processing apparatus is positioned at the predetermined point; and a cancel instruction unit operable, if the judgment is affirmative, to transmit a cancel instruction to an apparatus that is to execute a subsequent action according to the sequence information and is on a different branch from a remand-source apparatus.

Also, if the cancel instruction is received, the cancel instruction unit may transmit the cancel instruction, after the assigned action is completed, to the apparatus that is to execute a subsequent action according to the sequence information.

Also, the network image processing apparatus may further include a comment creation unit operable to create a comment for the selection, whereby the remand unit remands the created comment.

According to this structure, it is possible to communicate the intent of the remand-instruction agent to, for example, the user-in-charge who receives the remand.

Also, the comment creation unit may use image data scanned from a draft in creation of the comment.

According to this structure, it is possible to use image data scanned from a handwritten draft as a comment, thereby contributing to convenience for the remand-instruction agent.

The network image processing method pertaining to the present invention may further include the steps of transmitting and receiving a script that defines document handling, the script including actions which indicate document processing content, sequence information which indicates an execution sequence of the actions, and apparatus information which specifies the apparatuses to which the actions are assigned; executing an assigned action on a document received from an apparatus that executed a prior action according to the sequence information, to generate a document; adding, to the script, location information that indicates the apparatus in correspondence with the generated document; and transferring the generated document, after appending the received document, to an apparatus that is to execute a subsequent action according to the sequence information.

BRIEF DESCRIPTION OF DRAWINGS

These and other objects, advantages, and features of the invention will become apparent from the following description thereof taken in conjunction with the accompanying drawings, which illustrate specific embodiments of the present invention.

In the drawings:

FIG. 3 shows an outline of a script;

DETAILED DESCRIPTION OF PREFERRED EMBODIMENTS

Embodiment 1

Figure 1:
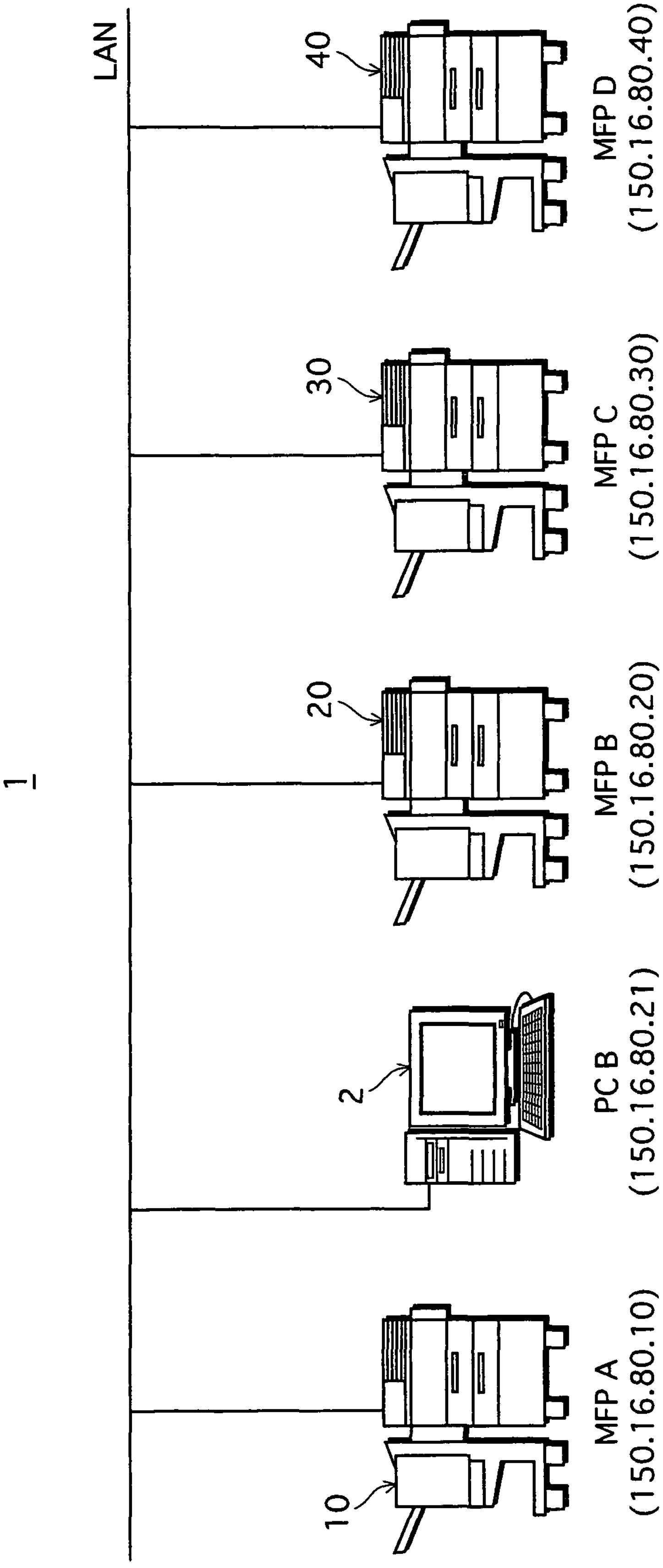
FIG. 1 shows an outline of a system construction of a network image processing system pertaining to embodiment 1.

FIG. 1 shows an outline of a system construction of a network image processing system pertaining to embodiment 1.

As shown in FIG. 1, the network image processing system 1 is composed of an MFP A10, a PC (personal computer) B2, an MFP B20, an MFP C30, and an MFP D40, all of which are network-connected on a LAN (Local Area Network).

Static IP (Internet Protocol) addresses are assigned to the apparatuses, and name resolution is performed by a DNS (Domain Name System) server which is not shown in the figure.

The PC B2 is an ordinary computer composed of hardware such as a PC body, a monitor, a keyboard, and a mouse. A HDD (hard disk drive) of the PC includes an OS (operating system), a document creation application, and a printer driver.

Figure 2:
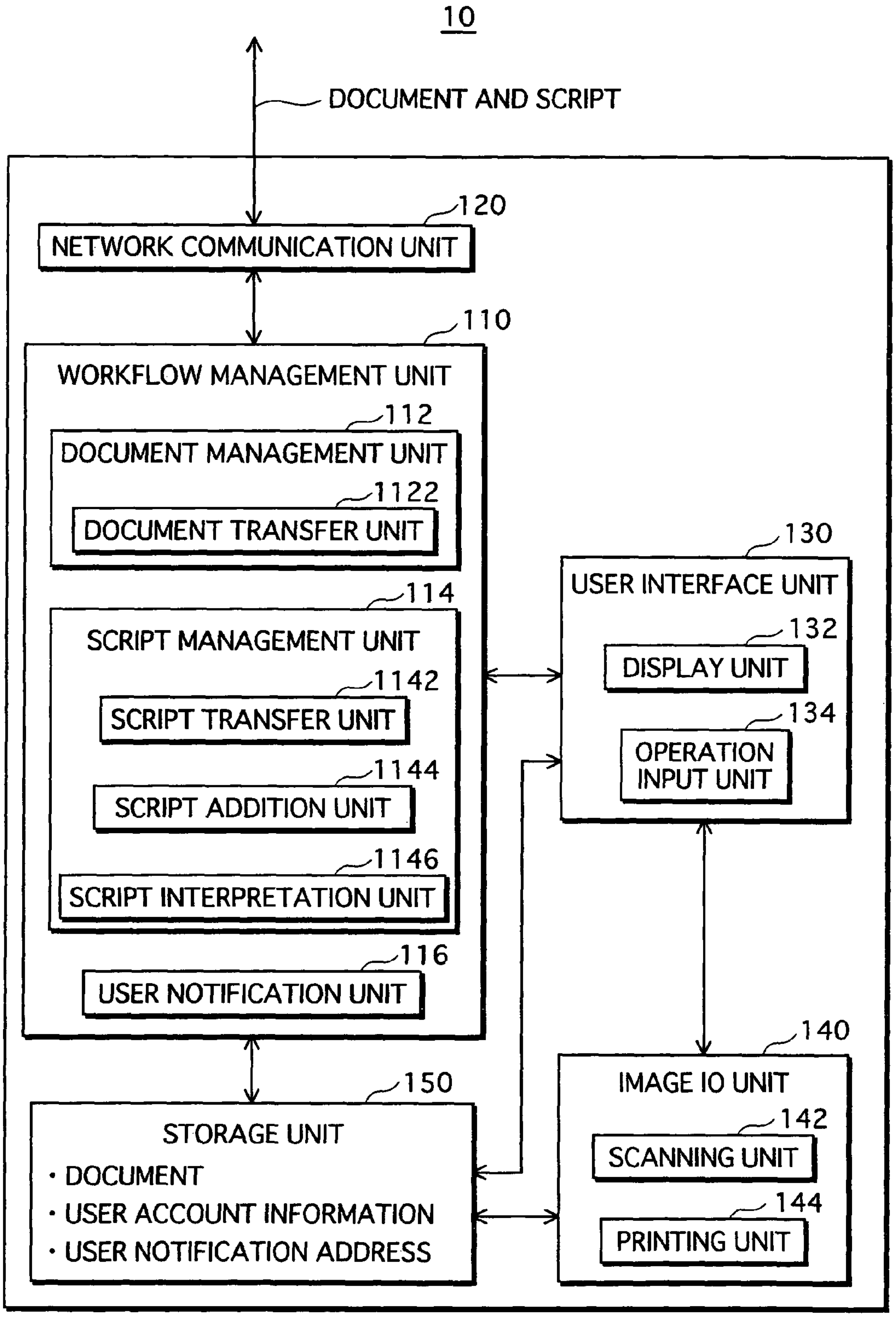
FIG. 2 is a functional block diagram of an MFP A10.

FIG. 2 is a functional block diagram of an MFP A10.

The MFP A10 includes a workflow management unit 110, a network communication unit 120, a user notification unit 116, a user interface unit 130, an image input/output (IO) unit 140, and a storage unit 150.

The workflow management unit 110 includes a document management unit 112 and a script management unit 114.

The document management unit 112 is a functional block including a document transfer unit 1122, and manages a document targeted for processing in a workflow.

The document transfer unit 1122 performs document transfer, including delivery and remanding, in accordance with the SMB (server message block) protocol, for example.

The script management unit 114 is a functional block including a script transfer unit 1142, a script addition unit 1144, and a script interpretation unit 1146, and manages an XML (extensible Markup Language) formatted workflow script (hereinafter, simply "script") which describes a process definition, etc.

The script transfer unit 1142 performs transfer of the script, including delivery and remanding, in accordance with the SMB protocol.

The script addition unit 1144 adds a processing history, etc. of the document to the script.

The script interpretation unit 1146, which is structured to include an XML parser, for example, interprets an XML formatted script and evaluates description content.

The user notification unit 116 is a functional block for notifying the user, and includes a mailer (email software).

The network communication unit 120, which is structured to include an NIC (Network Interface Card), performs transmission and reception of data (documents, scripts, etc.) with an external apparatus.

The user interface unit 130 includes a display unit 132 which performs various displays to the user and an operation input unit 134 which receives operation input from the user. The user interface unit 130 is constituted specifically from a touch panel and push-button keys.

In addition to being comparatively smaller than a PC monitor and having a low resolution, a display screen of this touch panel is not intended for rapid key input. Given this, the display should be made as simple as possible and allow the user to execute desired content with a minimum of keystrokes.

The image IO unit 140 includes a scanner unit 142 for scanning a draft to generate image data and a printing unit 144 for printing the image data, etc. on paper.

The storage unit 150 is a functional block including numerous boxes that are directories assigned per user, and stores various data related to the workflow.

The storage unit 150 also stores the document targeted for processing in the workflow, user account information for login to the MFP A10, user notification addresses that are contact addresses for users, etc.

The MFP B20 includes a workflow management unit 210, a network communication unit 220, a user notification unit 213, a user interface unit 230, an image 10 unit 240, and a storage unit 250. Note that since the constituent elements are similar to constituent elements with the same names in the MFP A10, their description is omitted (a functional block diagram of the MFP B20 is also not shown since it would be similar to FIG. 2).

The MFP C30 includes a workflow management unit 310, a network communication unit 320, a user notification unit 313, a user interface unit 330, an image 10 unit 340, and a storage unit 350. Since the constituent elements are similar to constituent elements with the same names in the MFP A10, their description is omitted.

The MFP D40 includes a workflow management unit 410, a network communication unit 420, a user notification unit 413, a user interface unit 430, an image IO unit 440, and a storage unit 450. Since the constituent elements are similar to constituent elements with the same names in the MFP A10, their description is omitted.

FIG. 3 shows an outline of a script.

A script 3 is XML formatted and roughly divided into three parts: a process definition portion 3A, a history portion 3B, and a remand instruction portion 3C.

The process definition portion 3A shows definitions of four actions from action 1 to action 4 (<action1> to <action4>) as process definitions of the workflow. Actions 1 to 4 (<action1> to <action4>) are executed in order of their trailing numbers, and also include information specifying execution apparatuses of each action. For example, action 1 involves receiving an instruction from "USER-A" to perform a "scan" action at an apparatus with the IP address "150.16.80.10" (MFP A10).

The history portion 3B shows a history of executed actions. “document1” is a name of the document after execution of action 1, “USER-A” is a name of a user who instructed the execution of action 1, and “150.16.80.10” is the IP address of an apparatus that executed action 1.

The remand instruction portion 3C shows a script and a document remand instruction. The remand instruction portion 3C shows a remand from a remand source, being IP address “150.16.80.40” (MFP B40), to a remand destination, being IP address “150.16.80.20” (MFP B20).

The meanings of the tags are as follows.

<name> . . . workflow name

<No> . . . identification number of the script

<mode> . . . shows processing content of the action

<who> . . . name of user who instructed execution of the action (shown as “not specified” in a case of an auto-action)

<where> . . . IP address of the action execution apparatus

<destination> . . . next transfer destination after execution of the action

Figure 4:
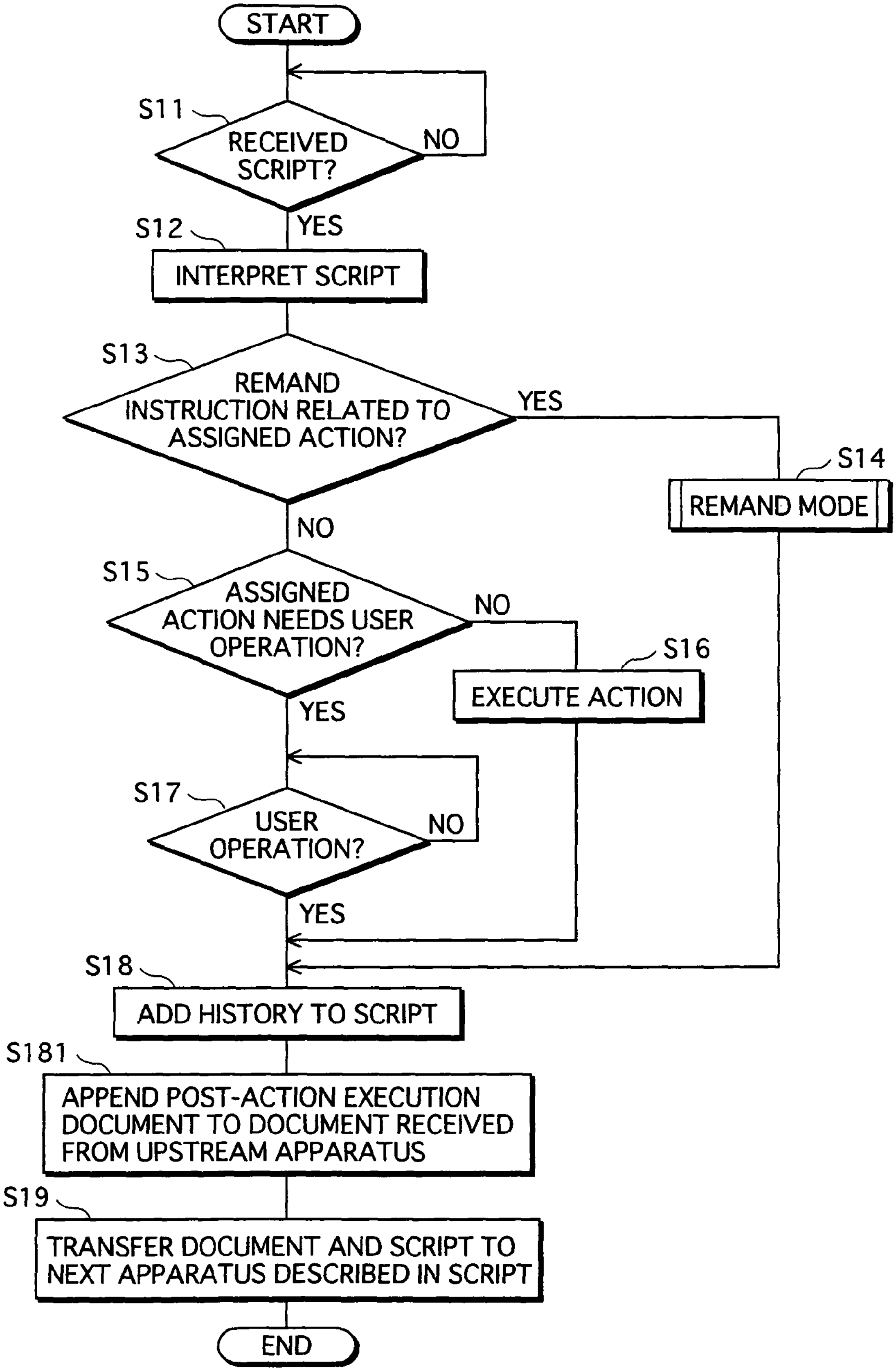
FIG. 4 is a flowchart showing processing related to a workflow executed by MFPs (MFP A10, MFP B20, MFP C30, MFP D40) which constitute the workflow.

<document destination> . . . transfer destination in a case of transferring the document to a terminal apparatus, other than an apparatus constituting the workflow (MFP), which assists in execution of the action <script destination> . . . next transfer destination of the script <history> . . . tag representing the processing history of the workflow <image name> . . . name of the document (image) after execution of the action <whose action> . . . name of user who instructed execution of the action <when> . . . date and time of execution of the action <where> . . . IP address of the apparatus which executed the action <where terminal> . . . IP address of the terminal apparatus which assisted in execution of the action <back to> . . . tag representing the remand instruction <from> . . . IP address of remand-source apparatus <to> . . . IP address of remand-destination apparatus <whose comment> . . . name of comment creator <attached file name> . . . name of file attachment transmitted to the remand destination FIG. 4 is a flowchart showing processing related to a workflow executed by MFPs (MFP A10, MFP B20, MFP C30, MFP D40) which constitute the workflow.

When an MFP receives a script (S11: YES), the MFP interprets the script (S12).

If the script includes a remand instruction for the MFP which received the script (S13: YES), processing moves to a remand mode (S14) subroutine.

If the script does not include a remand instruction for the MFP which received the script (S13: NO), the MFP judges whether an assigned action needs a user operation.

If the action does not need a user operation (auto action) (step S15: NO), the MFP automatically executes the action (S16).

If the action needs a user operation (manual action) (S15: YES), the MFP waits until the user performs the operation.

When the action is executed as a result of the user (user-in-charge) performing the operation (S17: YES), the MFP adds, to the script, the name of the action executor (name of the user-in-charge), the date and time of the execution, and the location (IP address) of the execution apparatus as history items (S18).

If the MFP which received the script is not the apparatus at the beginning of the workflow, the MFP appends the post-action execution document (the document generated by execution of the action) to the document received from an upstream apparatus (S181). Note that upstream and downstream are used in the context of the order of actions as described in the script, where an upstream apparatus executed a prior action, and a downstream apparatus is to execute a subsequent action.

The MFP then transfers the document and the script to the next apparatus described in the script (S19).

Figure 5:
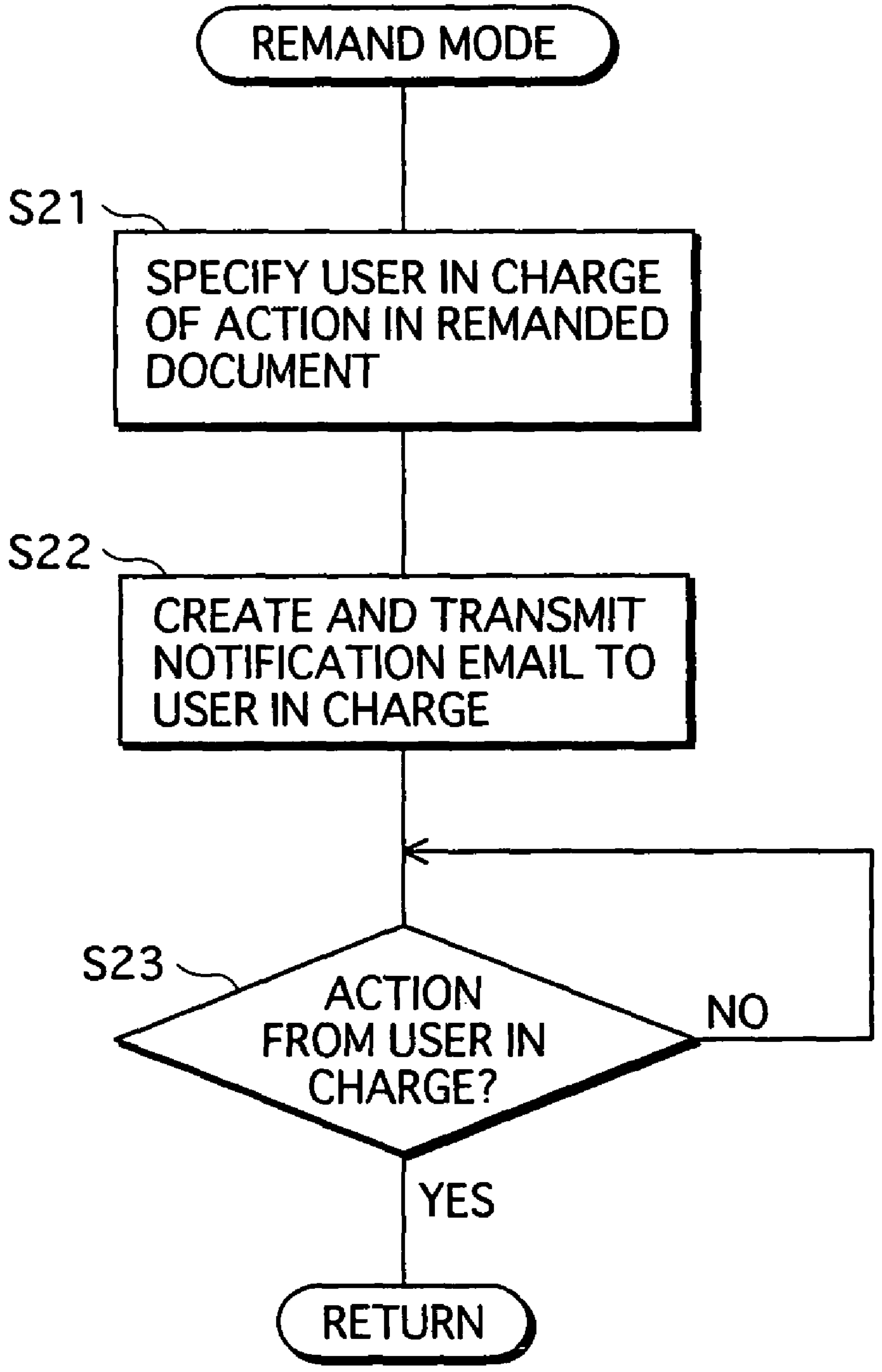
FIG. 5 is a flowchart showing a remand-mode subroutine.

FIG. 5 is a flowchart showing a remand-mode subroutine.

First, the MFP interprets the script and specifies a user-in-charge of the remanded document (S21).

The MFP creates and transmits a notification email to the user-in-charge (S22). This notification email is sent to prompt the user-in-charge to re-execute the action. Note that a specific example of the notification email is described later using FIG. 9.

If there is an instruction from the user-in-charge to execute the action (S23: YES), processing returns to a main routine after execution of the action.

The following describes a construction of the target document pertaining to this embodiment of the present invention. The process of creating the target document is described thereafter.

Figure 6:
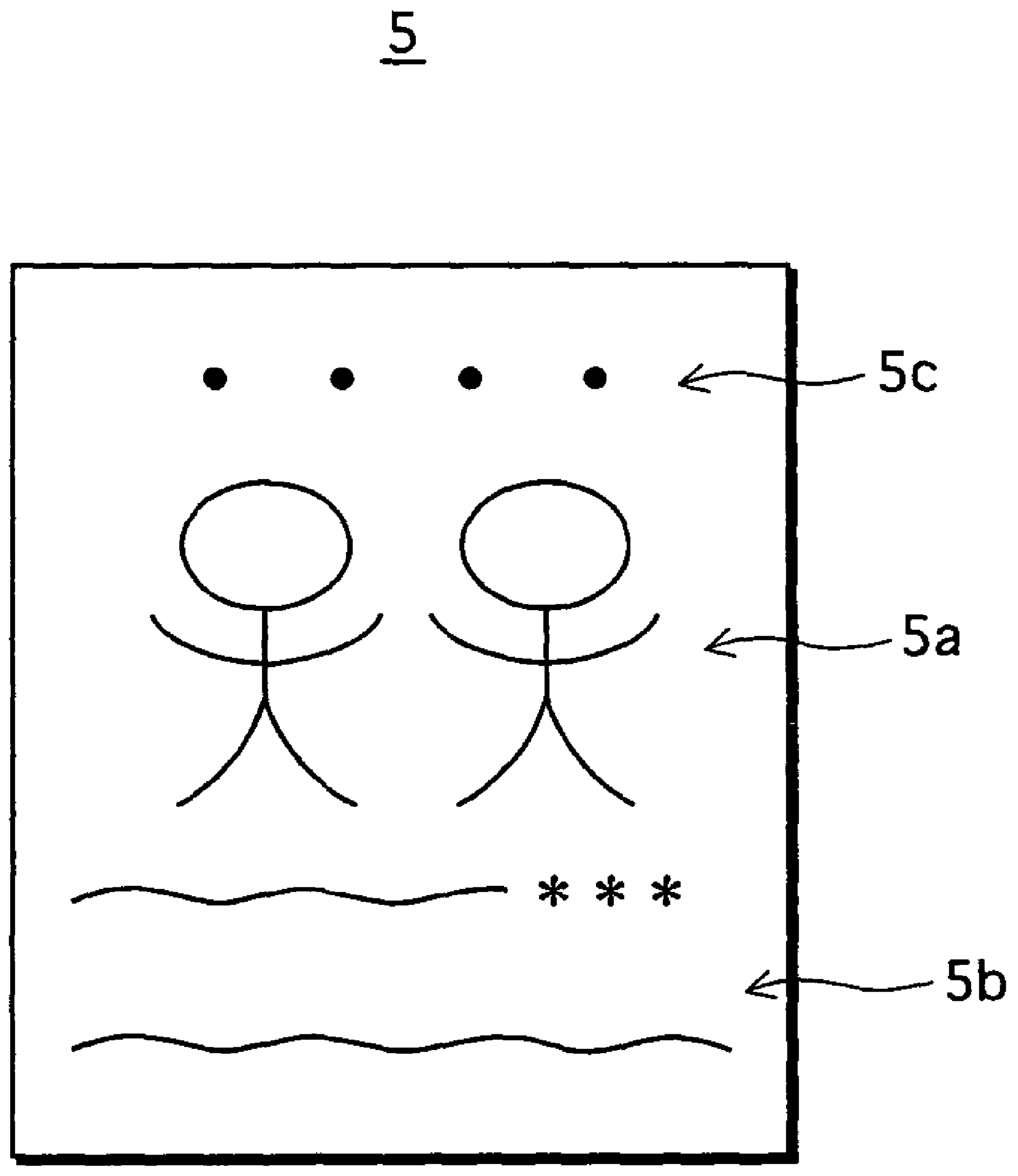
FIG. 6 shows a structure of a completed target document.

FIG. 6 shows a structure of a completed target document.

A pamphlet 5, being the target document, is constituted from three parts: an illustration 5*a*, a body text 5*b*, and a headline (promotional phrase) 5*c*.

Each part is created by a different user-in-charge, whereby the users-in-charge refer to a part created by a previous user-in-charge to create their own part.

The following specifically describes the creation process.

(1) First, a user A is responsible for the illustration 5*a*.

(2) Next, a user B, who is responsible for the body text 5*b*, refers to the previously created illustration 5*a* to create a body text in fitting with the illustration.

(3) A user C, who works on the headline 5*c*, then refers to the previously created illustration 5*a* and the body text 5*b* to create the headline 5*c*.

(4) Lastly, a user D, who is responsible for overseeing pamphlet creation, checks the entire pamphlet 5. The user D has authority to remand the script to a user and instruct the user to redo a task (action) if there is an error.

Figure 7:
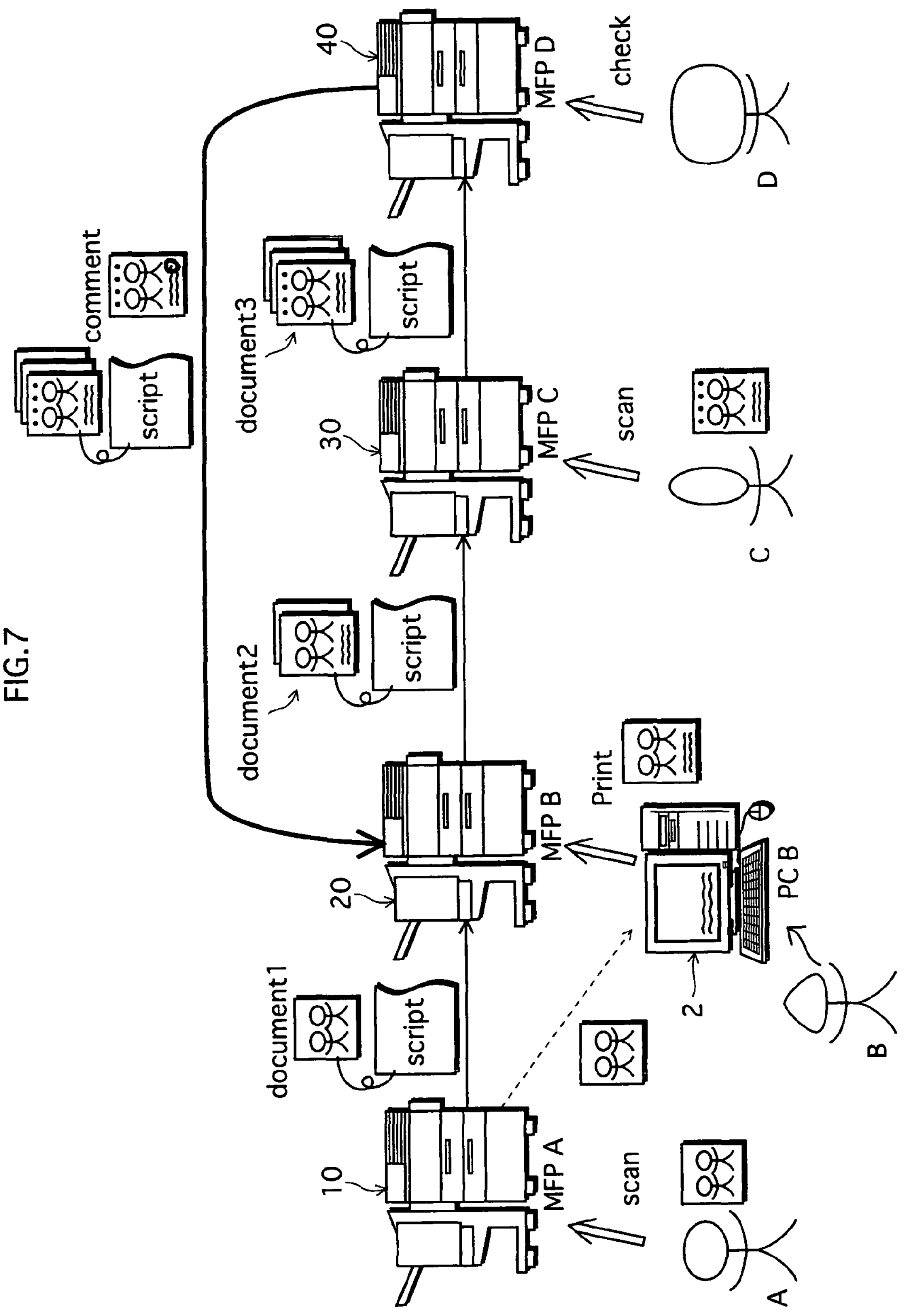
FIG. 7 shows an overview of devices cooperating to complete a pamphlet 5.
Figure 8:
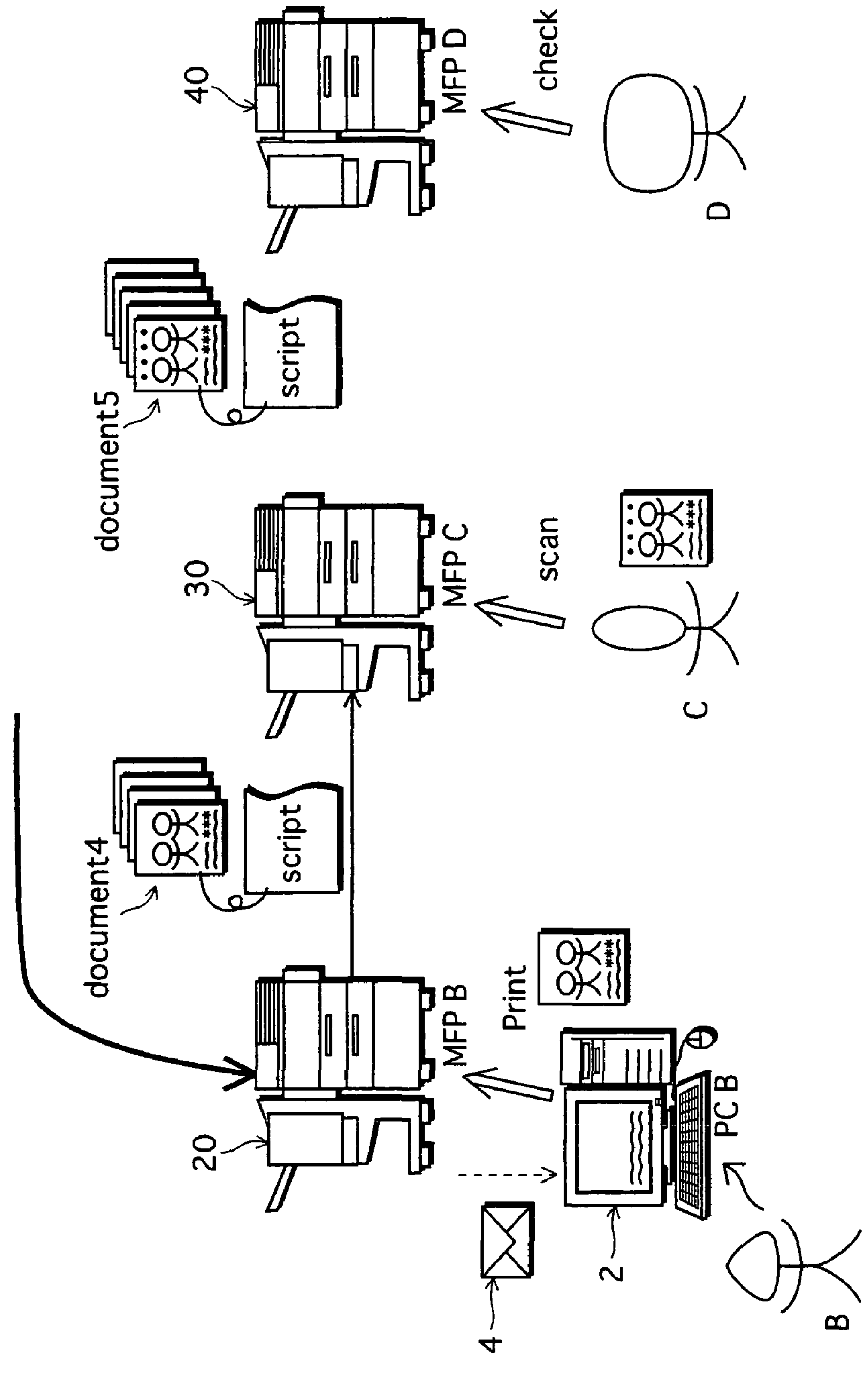
FIG. 8 shows an overview of devices cooperating to complete the pamphlet 5.

FIGS. 7 and 8 show an overview of the devices transmitting and receiving documents to complete the pamphlet 5. FIG. 7 shows a flow of the document and the script up to the point of a remand from the MFP D40 to the MFP B20, while FIG. 8 shows a flow after the remand.

Note that the script relating to the creation of the pamphlet 5 has been created in advance and stored in the MFP A10 before initiation of the actions.

In FIGS. 7 and 8, “scan,” “Print,” “scan,” and “check” are actions assigned to the MFP A10 (user-in-charge A), the MFP B20 (user-in-charge B), the MFP C30 (user-in-charge C), and the MFP D40 (user-in-charge D) respectively.

The following describes in order the actions executed by the apparatuses.

(1-1) The user A hand-draws an illustration and executes the action “scan” by causing the scanning unit 142 of the MFP A10 to scan the draft.

(1-2) The MFP A10 adds, to the script, its IP address as the action execution apparatus, the post-action execution document name “document1”, etc. as history items. In accordance with the description in the script, the MFP A10 then transfers the document and the script to the MFP B20, while transferring the document to a PC B2.

(2-1) The user B uses the document creation application provided in the PC B2 to create a body text 5*b* in fitting with the illustration 5*a*, and causes the MFP B20 to execute the action "Print" by using the printer driver to transmit a print instruction. It is possible for the MFP B20 to judge whether the transmitted print instruction is related to the workflow by embedding an identification number of the workflow in the print instruction.

(2-2) The MFP B20 adds, to the script, its IP address as the action execution apparatus, the post-action execution document name "document2", etc. as history items, and appends the post-action execution document ("document2") to the document ("document1") received from the upstream MFP A10. In accordance with the description in the script, the MFP B20 then transfers the document ("document1"+"document2") and the script to the MFP C30.

Given that the PC B2 was used when executing the action "Print," an IP address of the PC B2 may be included in the history as the terminal apparatus used in execution of the action. Note that the PC B2 can also be referred to as an apparatus which assisted in execution of the action assigned to the MFP B20, or an apparatus which indirectly caused execution of the action.

(3-1) The user C handwrites a headline and executes the action "scan" by scanning the document with the scanning unit 342 of the MFP C30.

(3-2) The MFP C30 adds, to the script, its IP address as the action execution apparatus, the post-action execution document name "document3", etc. as history items, and appends the post-action execution document ("document3") to the document ("document 1"+"document2") received from the upstream MFP A10. In accordance with the description in the script, the MFP C30 then transfers the document ("document1"+"document2"+"document3") and the script to the MFP D40.

(4-1) The user D causes the printing unit 444 of the MFP D40 to print the pamphlet 5, being the processing target document composed of the illustration 5*a*, body text 5*b*, and headline 5*c*, and visually checks the printout. Supposing there is an error in the body text 5*b*, the user D remands the document, the script, and a comment to the MFP B20. This remand is described later.

(5-1) Moving to FIG. 8, the MFP B20 which received the remanded script, etc. from the downstream MFP D40 transmits an email notification of the remand to the user B (to the user B's contact address) who is in charge of the action assigned to the MFP B20.

Figure 9:
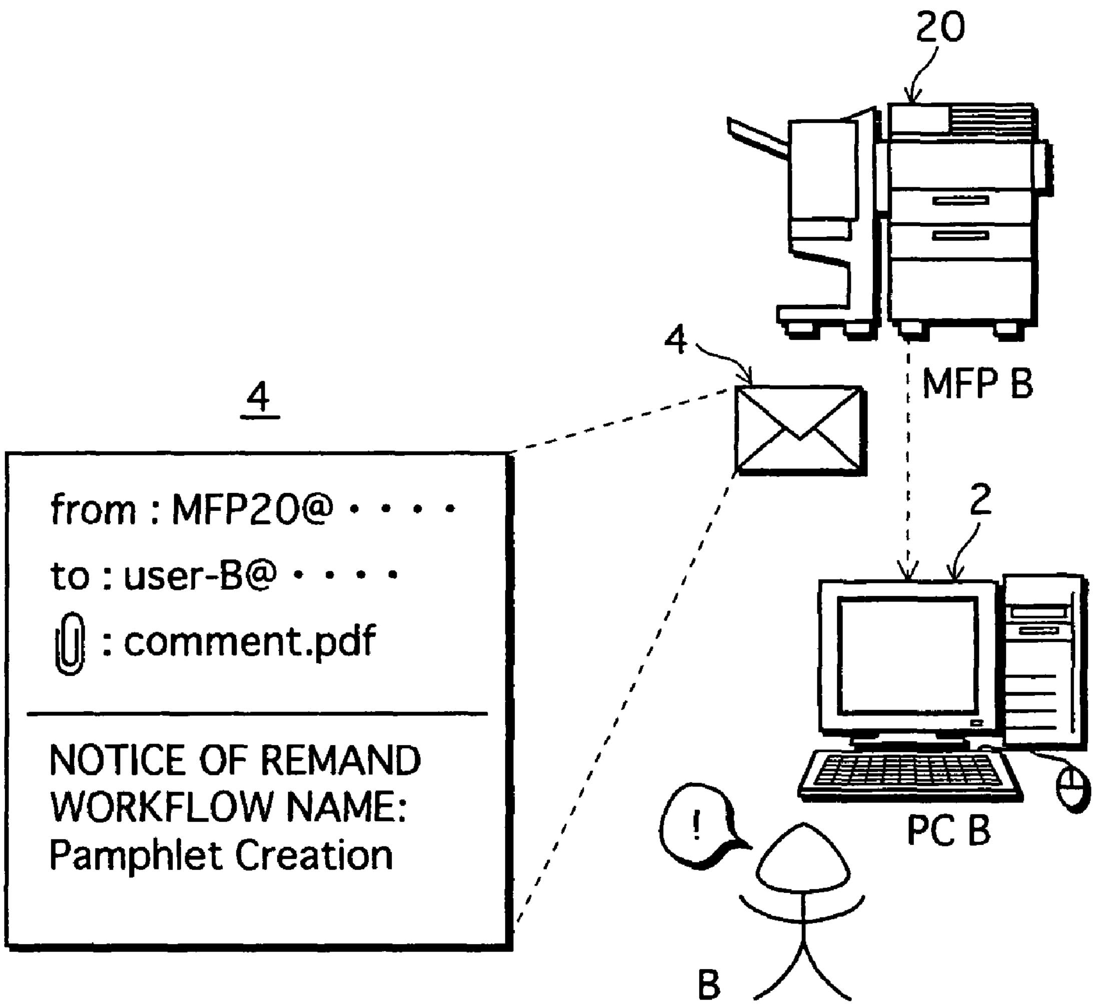
FIG. 9 illustrates a notifying email.

FIG. 9 illustrates a notifying email. The body of an email 4 includes the workflow name (Pamphlet Creation) and the fact that there was a remand instruction. The comment written by the user D is also attached as a file attachment.

The user B, having completed their responsibility of creating the body text 5*b* for the pamphlet 5, may have little interest in how the creation of the pamphlet 5 is progressing. Given this, it is possible to prompt the user B to quickly redo the action by transmitting such a notification, thereby avoiding a back up in processing.

Note that the notification is not limited to an email. The user B may be notified using other means. For example, notification may be performed using a FAX transmission or Instant Messenger (IM).

Returning to FIG. 8, the user B who received the remand notification refers to the comment written by the user D, corrects the error in the body text 5*b*, and again executes the action "Print."

(5-2) The MFP B20 adds, to the script, its IP address as the action execution apparatus, and the post-action execution document name "document4," etc. as history items, and appends the post-action execution document ("document4") to the document ("document 1"+"document2"+"document3") received from the upstream MFP D40 as a result of the remand. In accordance with the description in the script, the MFP B20 then transfers the document ("document1"+"document2"+"document3"+"document4") and the script to the MFP C30.

(6) The user C refers to the illustration 5*a* and the corrected body text 5*b*, and again executes the action "scan" by scanning the document with the scanning unit 342 of the MFP C30.

(7) The user D checks the pamphlet 5 with the corrected body text 5*b* and approves the document as being without any errors, whereby the pamphlet is complete.

The following describes screens displayed to the user D by the user interface unit (touch panel) 430 of the MFP D40, and content input by the user D for the remand instruction and the like with reference to FIGS. 10 to 19.

Figure 10:
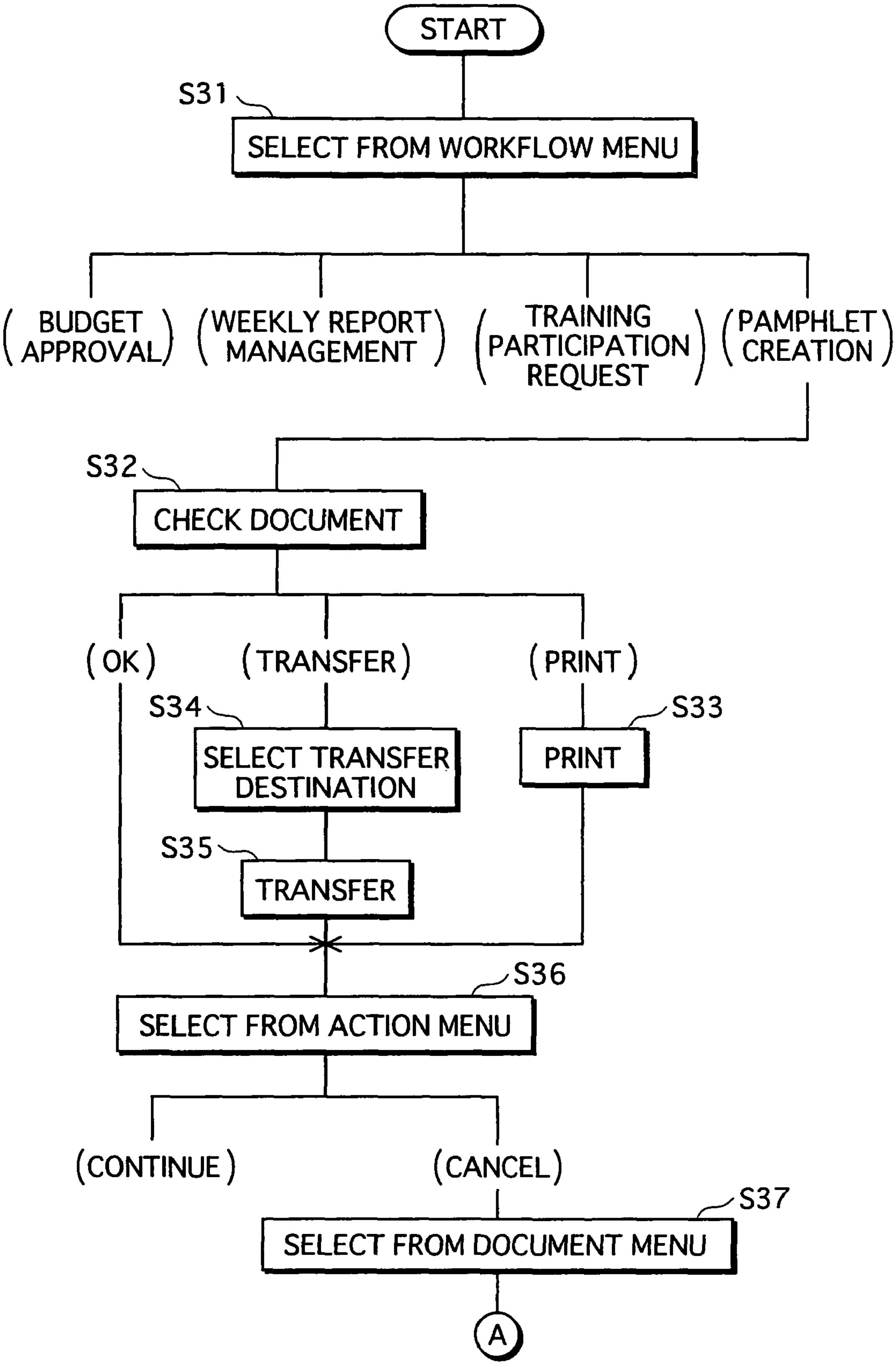
FIG. 10 is a flowchart showing reception processing and display processing related to a workflow performed by the MFP D40.
Figure 11:
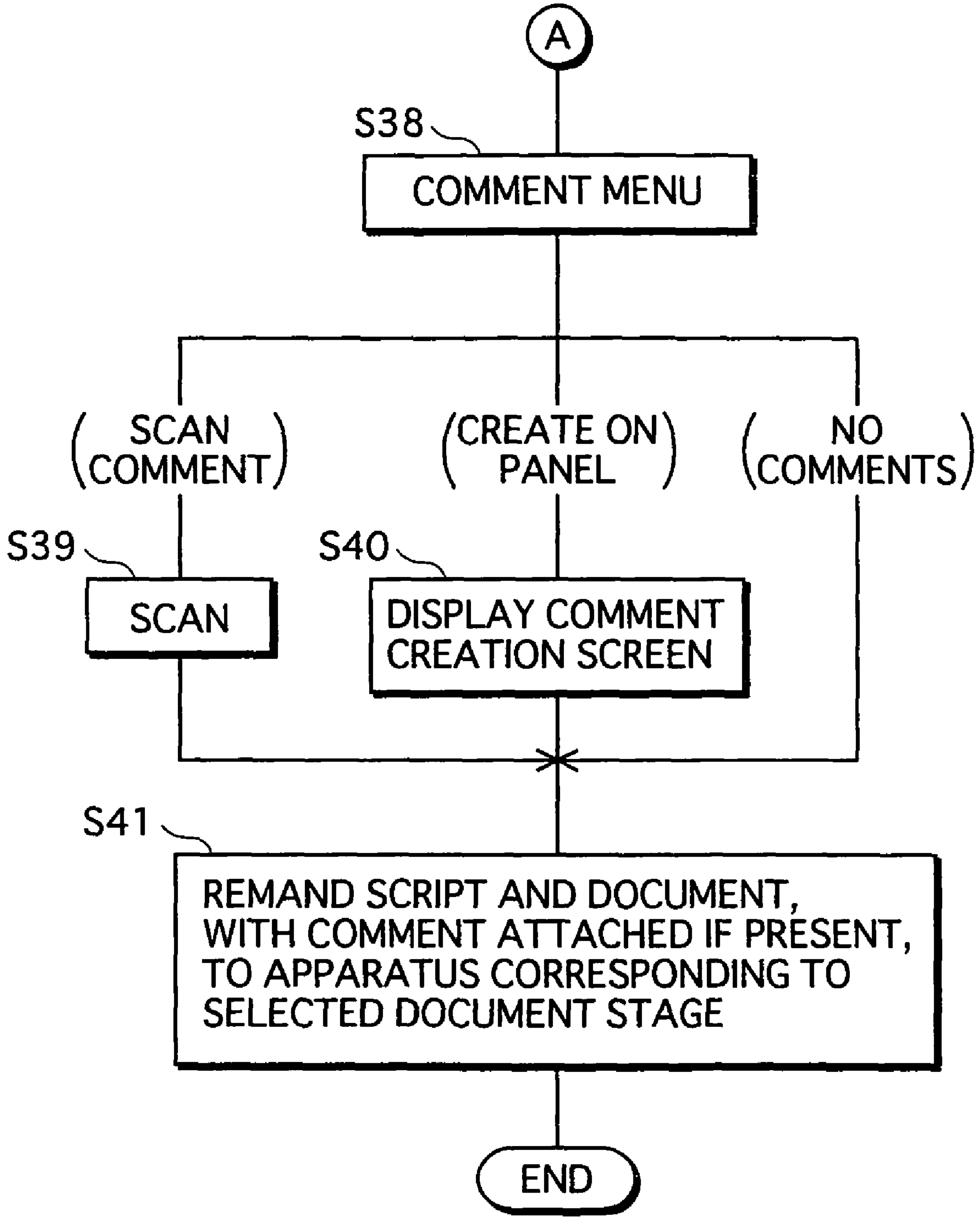
FIG. 11 is a flowchart showing reception processing and display processing related to the workflow performed by the MFP D40.

FIGS. 10 and 11 are flowcharts showing reception processing and display processing which are related to the workflow and performed by the MFP D40.

The user D is assumed to have undergone a predetermined authentication, and is logged into the MFP D40.

First, the MFP D40 displays a workflow menu and receives a selection (S31).

Figure 12:
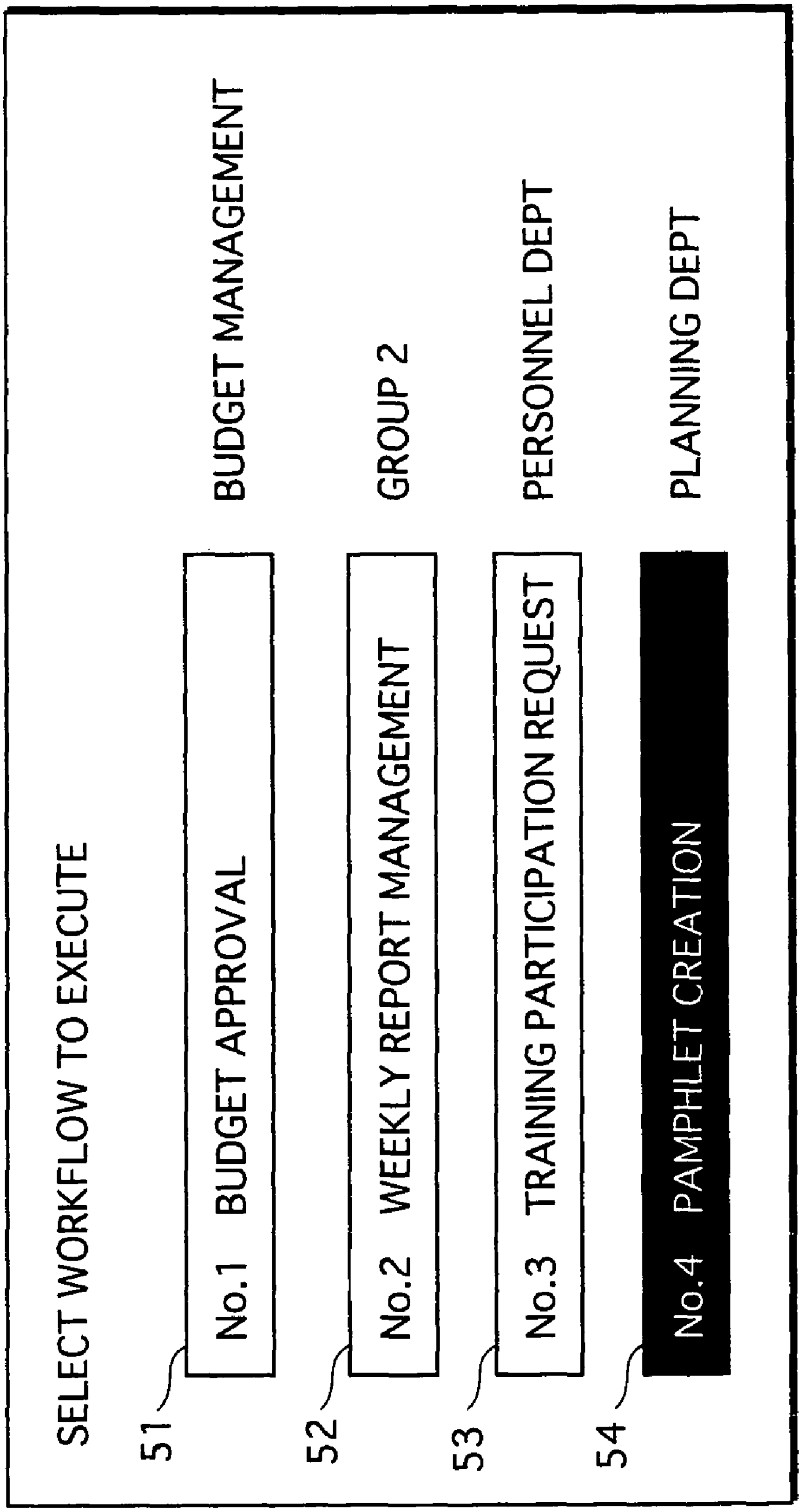
FIG. 12 is a workflow menu screen displayed in step S31.

FIG. 12 is a workflow menu screen displayed in step S31.

The displayed screen includes keys 51 to 54 as workflows. The keys show BUDGET APPROVAL, WEEKLY REPORT MANGEMENT, TRAINING PARTICIPATION REQUEST, and PAMPHLET CREATION respectively, and are selectable by depression.

If the PAMPHLET CREATION key 54 is selected, processing moves to confirmation of the document (S32).

Figure 13:
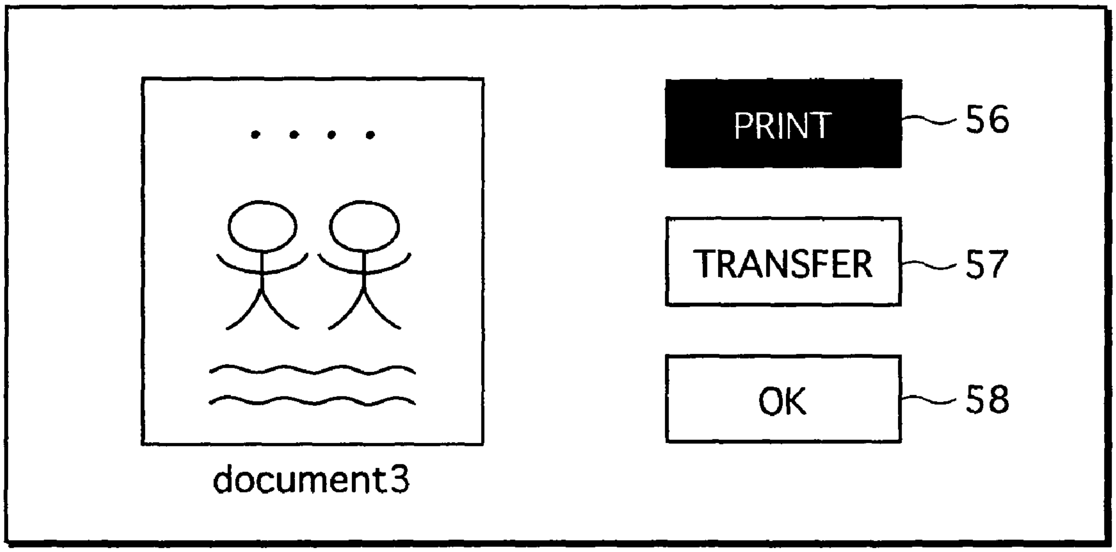
FIG. 13 is a document check screen displayed in step S32.

FIG. 13 is a document check screen displayed in step S32.

The latest document ("document3") that was generated by the third action is displayed on the screen. If a PRINT key 56 is selected, the displayed document is printed (S33)

If a TRANSFER key 57 is selected, the display switches to a transfer-destination select screen (S34), and the document is transferred to the selected transfer destination (S35).

If an OK key 58 is selected, processing moves to selection from the action menu (S36).

Figure 14:
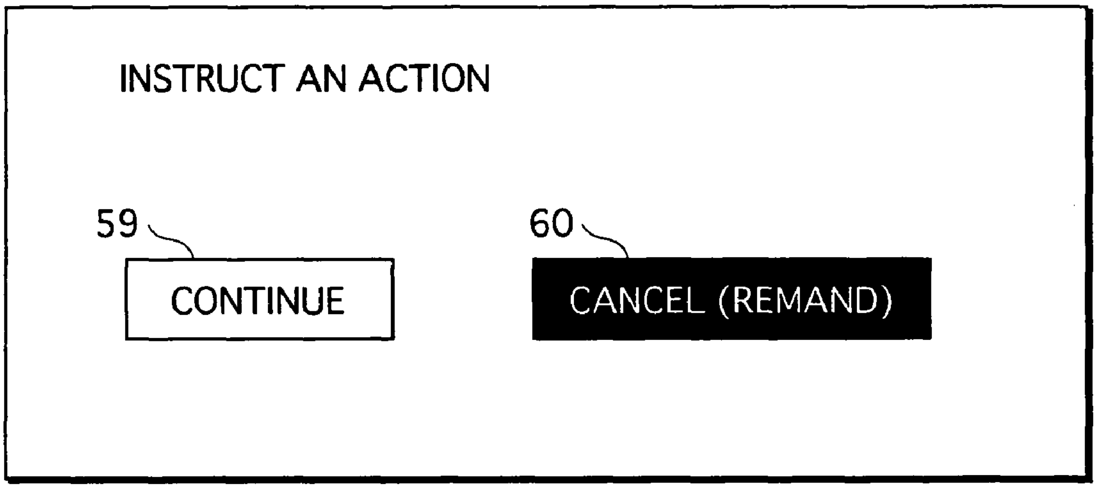
FIG. 14 is an action menu screen displayed in step S36.

FIG. 14 is an action menu screen displayed in step S36.

If a CONTINUE key 59 is selected, the user D is considered to have approved the document ("document3").

If a CANCEL (REMAND) key 60 is selected, processing moves to a document menu screen displayed in units of action (S37).

Figure 15:
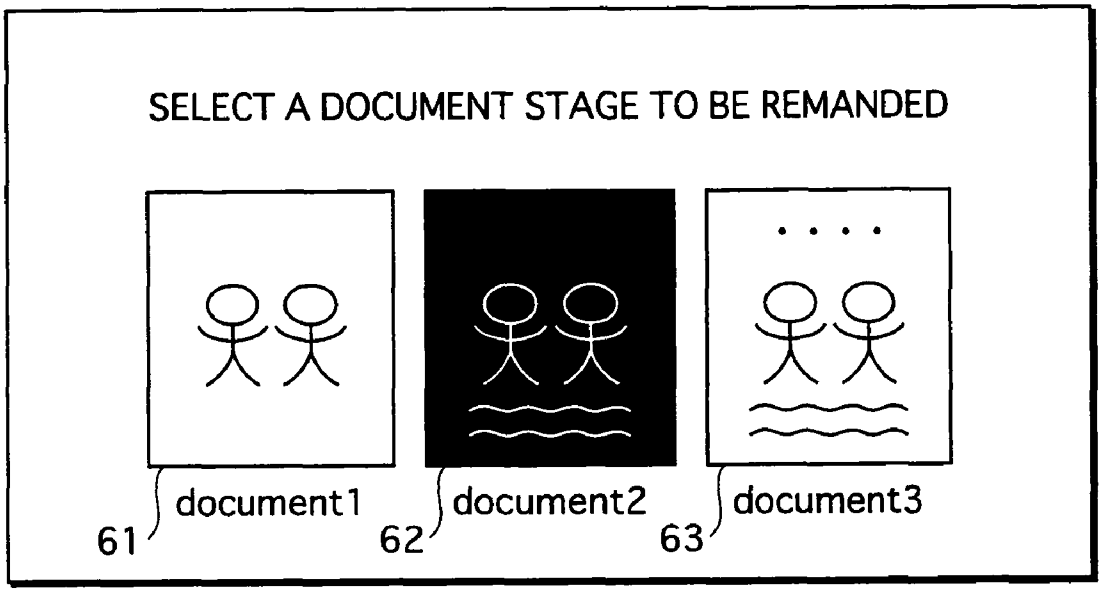
FIG. 15 is document menu screen displayed in units of action in step S37.

FIG. 15 is document menu screen displayed in units of action in step S37.

The three documents "document1", "document2", and "document3" are displayed on the select screen, and "document2" is selected.

By displaying the document in units of action, it is possible for the user D to see at which task stage (action) the error arose. From a different perspective, the user D needs to only visually recognize at which stage the error arose, rather than needing to be particularly aware of who is responsible for the error (i.e. that the user B created the body text 5*b*).

When the document stage to be remanded is selected, processing moves to the comment menu (S38).

Figure 16:
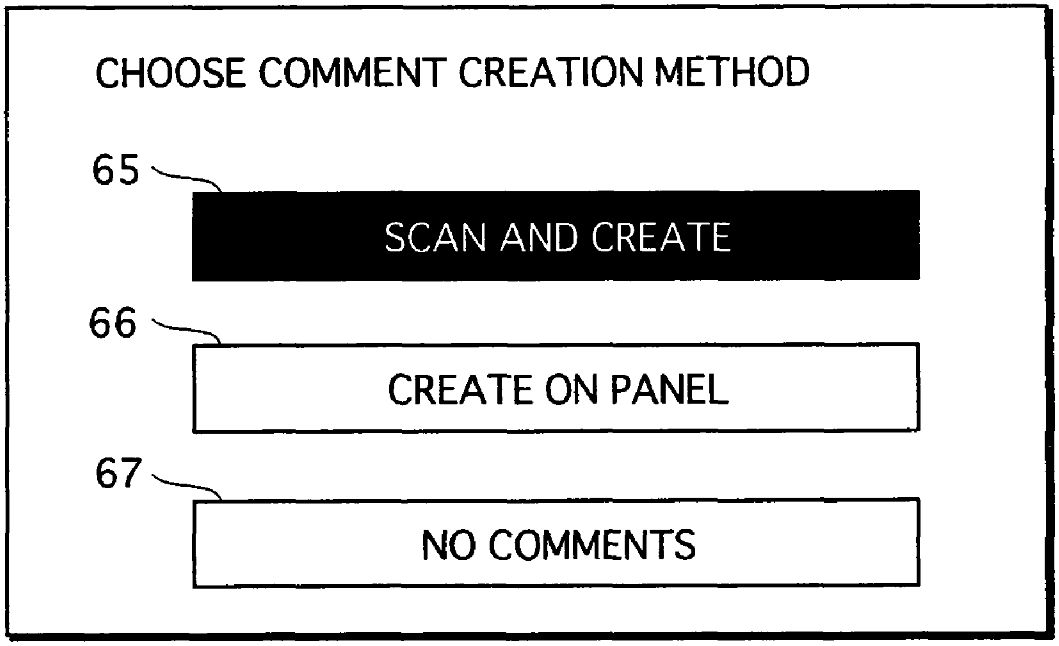
FIG. 16 is a command menu screen displayed in step S38.

FIG. 16 is a command menu screen displayed in step S38.

A SCAN AND CREATE key 65, a CREATE ON PANEL key 66, and a NO COMMENTS key 67 are displayed on the screen.

When the SCAN AND CREATE key 65 is selected, the MFP D40 enters a scan-standby state (S39).

Figure 17:
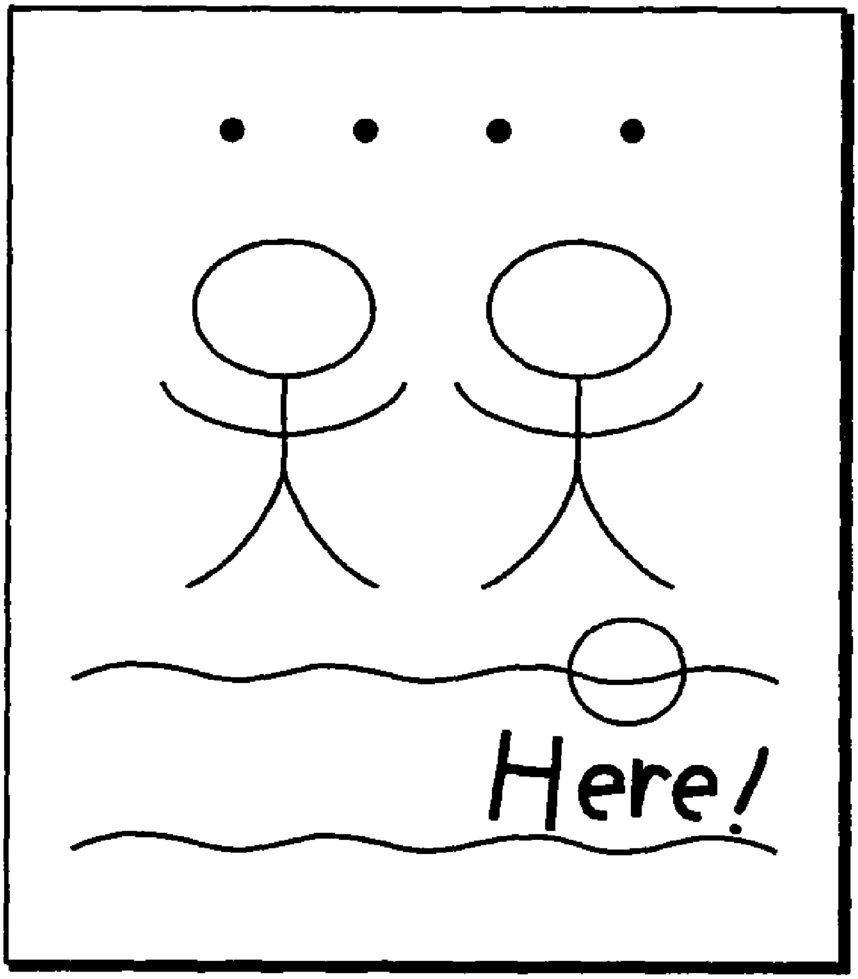
FIG. 17 shows a draft 6 to be scanned.

FIG. 17 shows a draft 6 to be scanned. A body text of the draft 6 includes an area circled by the user D and a handwritten memo saying "Here!"

The image data generated by scanning this draft 6 into the MFP D40 can be handled as a comment for the document ("document2"), thereby enabling the user D to easily create a comment for the document.

Note that if the CREATE ON PANEL key 66 is selected, the screen switches to a comment creation screen display (S40).

Figure 18:
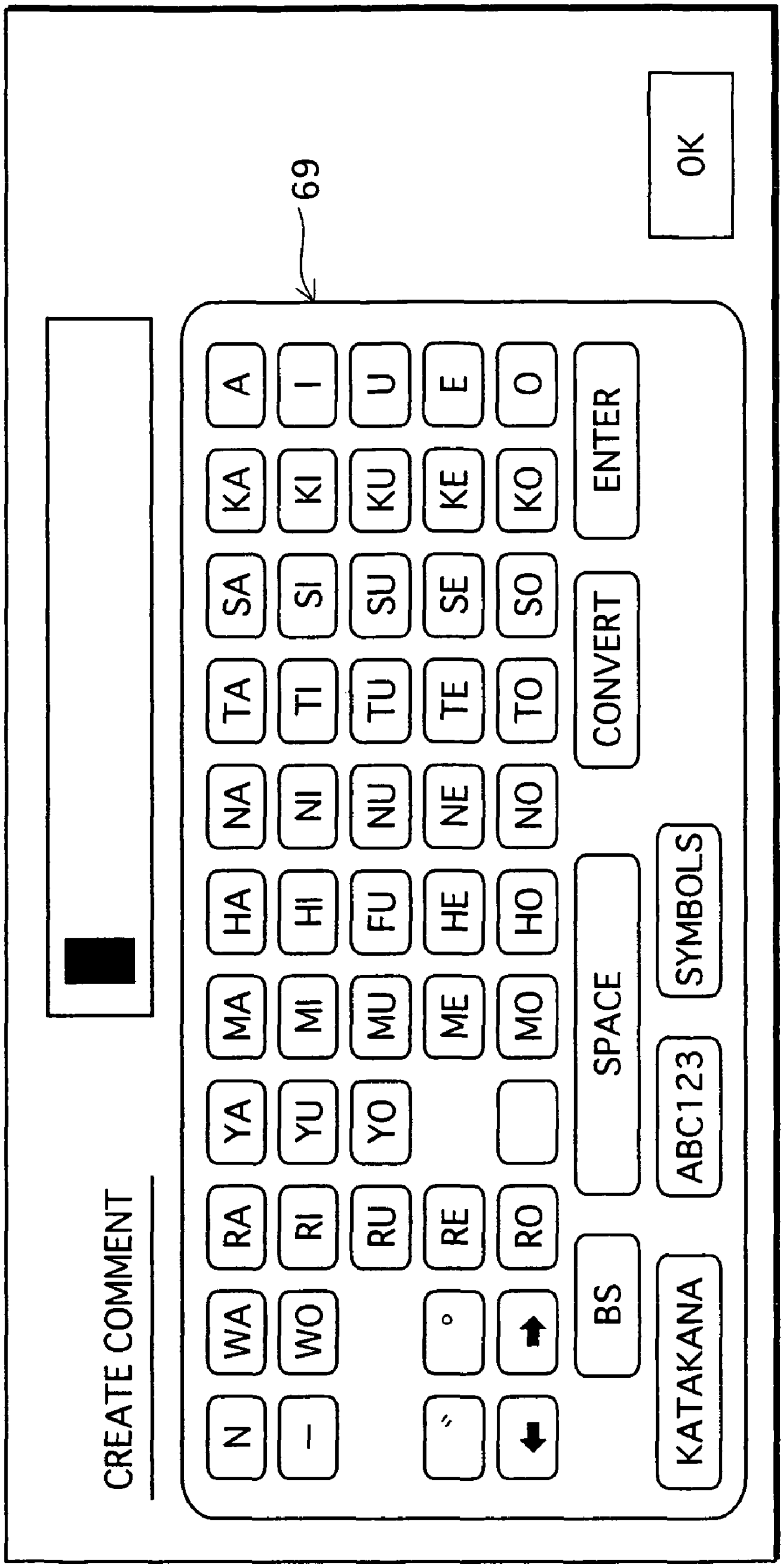
FIG. 18 shows a screen displayed in step S40.

FIG. 18 is a screen displayed in step S40, whereby a virtual keyboard 69 is displayed on the screen. Comments are received via this virtual keyboard 69.

When processing related to creation of a comment for attachment is completed in steps S38 to S40, the document management unit 412 references the script and remands the script and the document, with the comment attached, to the MFP B20 which is the apparatus at the document ("document2") stage selected in step S37.

As mentioned above, it is possible according to the network image processing system pertaining to the present embodiment for the user D who wants to perform a remand because of an error in the body text 5*b* to visually determine the body text 5*b* task stage from the document listed in units of action, and easily remand the document to the body text 5*b* task stage.

A structure which remands the script, the document, and the comment to the MFP B20 (see FIG. 7) is described in embodiment 1, although the remanded data is not limited to this structure. The following describes variation 1 pertaining to embodiment 1.

Variation 1

Figure 19:
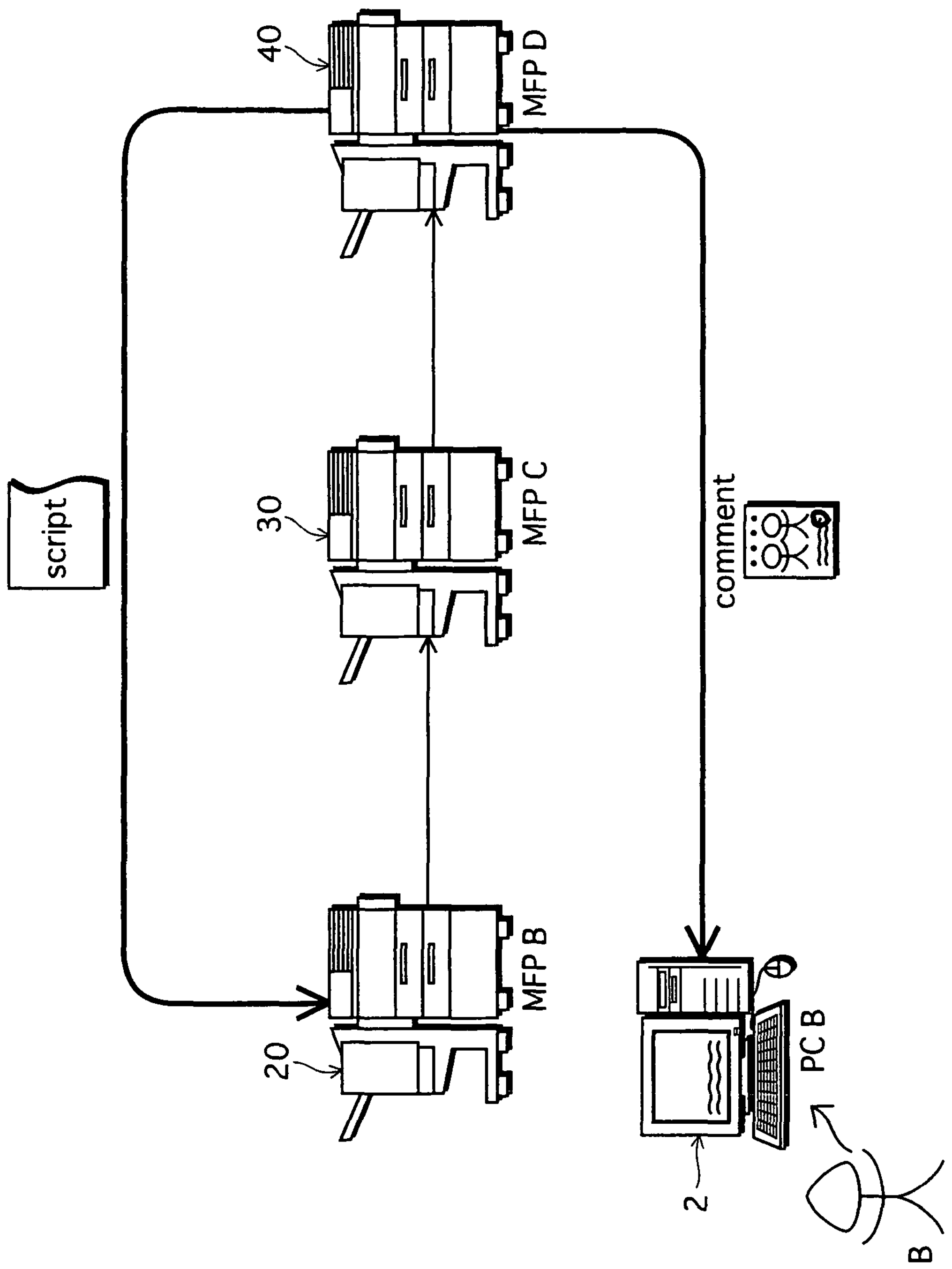
FIG. 19 illustrates a data flow in a variation of embodiment 1.

FIG. 19 illustrates a data flow in a variation of embodiment 1.

As shown in the figure, the comment is transferred directly to the PC B2 in the present variation. Given that the PC B2 is the apparatus used by the user B in execution of the action, transferring the comment to this apparatus contributes to convenience for the user B. It is also possible to combine a remand notification function with the comment in such a case.

The present variation is structured such that documents generated whenever an action is executed are stored (temporarily) in the storage units of the MFPs, and only the script is remanded from the MFP D40 to the MFP B20.

While remanding with the document attached makes it easier for users in the workflow to check changes in the document, on the other hand, this increases the amount of data flowing between the apparatuses. The present variation is able to avoid this problem.

Variation 2

The processing target document is a single-page pamphlet in embodiment 1, although the processing target document may be a booklet spanning multiple pages as in variation 2 mentioned hereinafter.

Figures 20A, 20B, 20C, 20D:
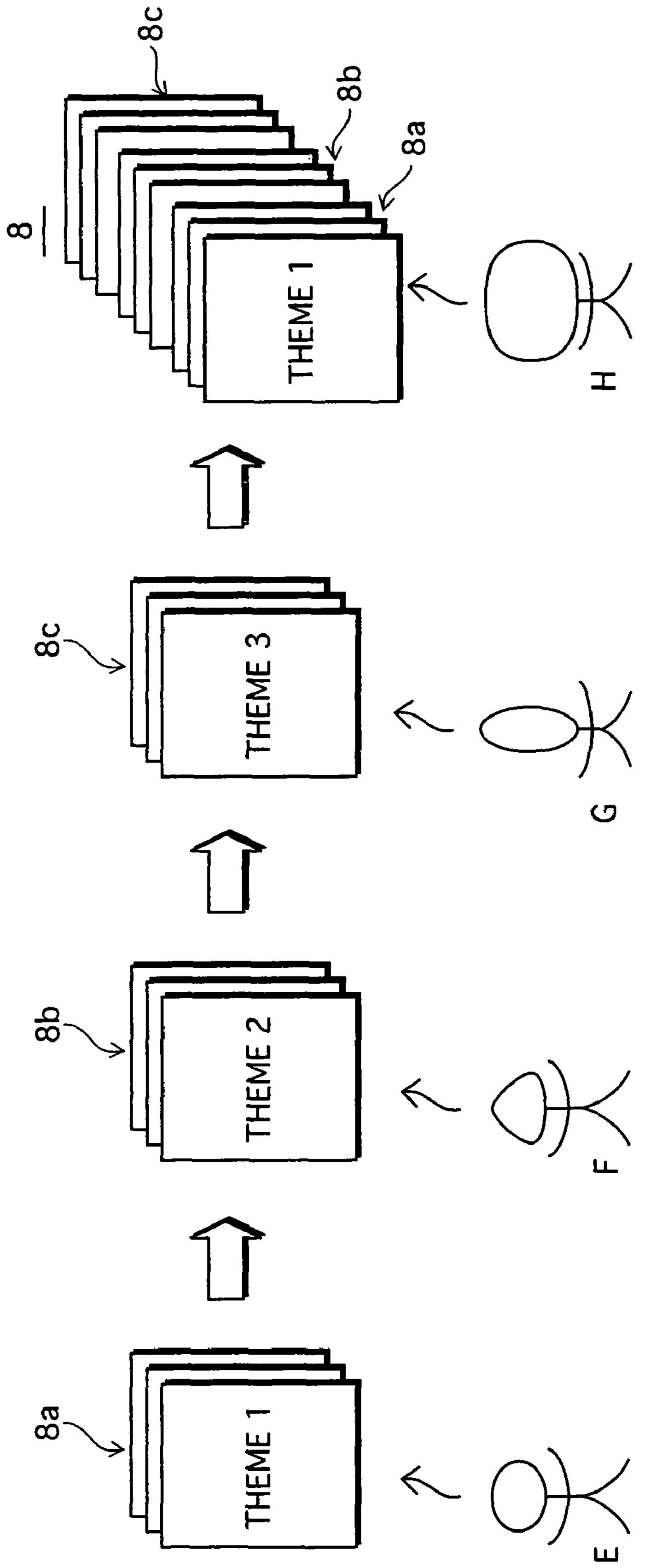
FIG. 20 describes a flow of a processing target document in a second variation pertaining to embodiment 1.

FIG. 20 describes a flow of a processing target document in a second variation pertaining to embodiment 1.

A block copy 8 of a booklet that is the target document is constituted from three parts: a "Theme 1" 8*a*, a "Theme 2" 8*b*, and a "Theme 3" 8*c*. The themes are all in some way related to a common theme. Users in charge who are downstream in the workflow (user F and user G) create their assigned themes so as to be consistent with upstream content. Each user's responsibility and remand authority is as follows.

(1) A user E is in charge of the "Theme 1" 8*a* (FIG. 20 A).

(2) The user F is in charge of the "Theme 2" 8*b*, and has authority to remand to the "Theme 1" 8*a* creation task stage (FIG. 20 B).

(3) The user G is in charge of the "Theme 3" 8*c*, and has authority to remand to previous task stages (user E and user F) (FIG. 20 C).

(4) A user H performs a final check of the block copy 8 composed of "Theme 1" 8*a* to "Theme 3" 8*c*, and has authority to remand to the users in charge of the themes (user E, user F, and user G) (FIG. 20 D).

Embodiment 2

If there is a remand in a workflow including a split, the present embodiment prevents the needless execution of actions in a different branch from the remand.

Figure 21:
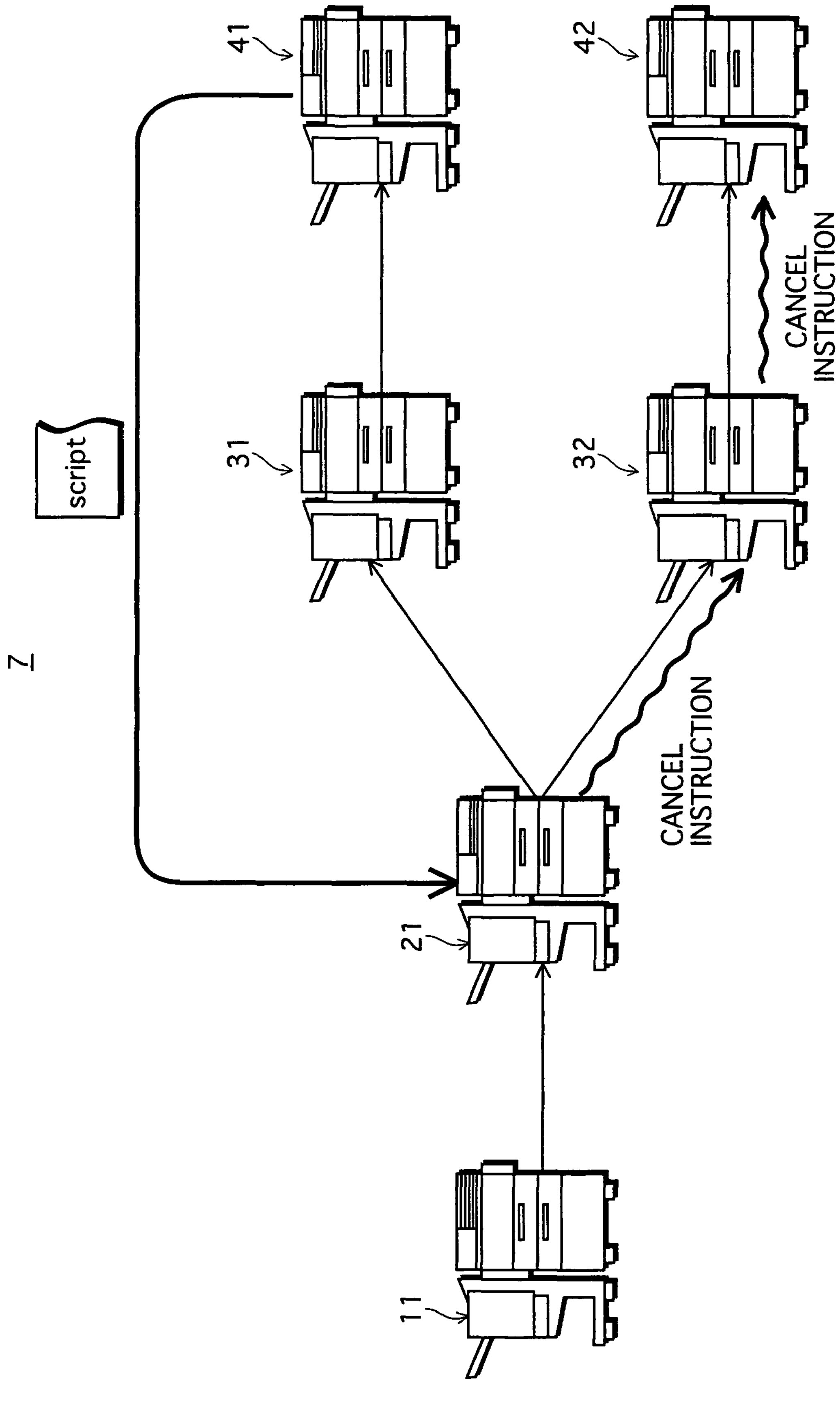
FIG. 21 shows a system structure as well as a flow of a script and a cancel instruction pertaining to embodiment 2.

FIG. 21 shows a system structure as well as a flow of a script and a cancel instruction (shown as a wavy arrow) pertaining to embodiment 2.

A network image processing system 7 is constituted from an MFP 11, an MFP 21, an MFP 31, an MFP 32, an MFP 41, and an MFP 42. The MFPs are interconnected via a network.

A script is in a format similar to the script described using FIG. 3, although the script further includes information which indicates a split (using a tag such as <split> for example) at the MFP 21 which is second in an order of the workflow.

The workflow thread is split at the MFP 21, and the script has been remanded from the MFP 41 apparatus on one of the branches of the split to the MFP 21 apparatus at the split.

When there is a remand in such a case, it is assumed that the processing target document in the non-remand-source MFP 32 and MFP 42 branch will differ from the processing target document in the other branch.

In other words, if content corrected in the MFP 21 as a result of the remand effects processing content in the MFP 32 and MFP 42, actions related to the pre-correction document which are performed in the MFP 32 and MFP 42 will become purposeless.

Figure 22:
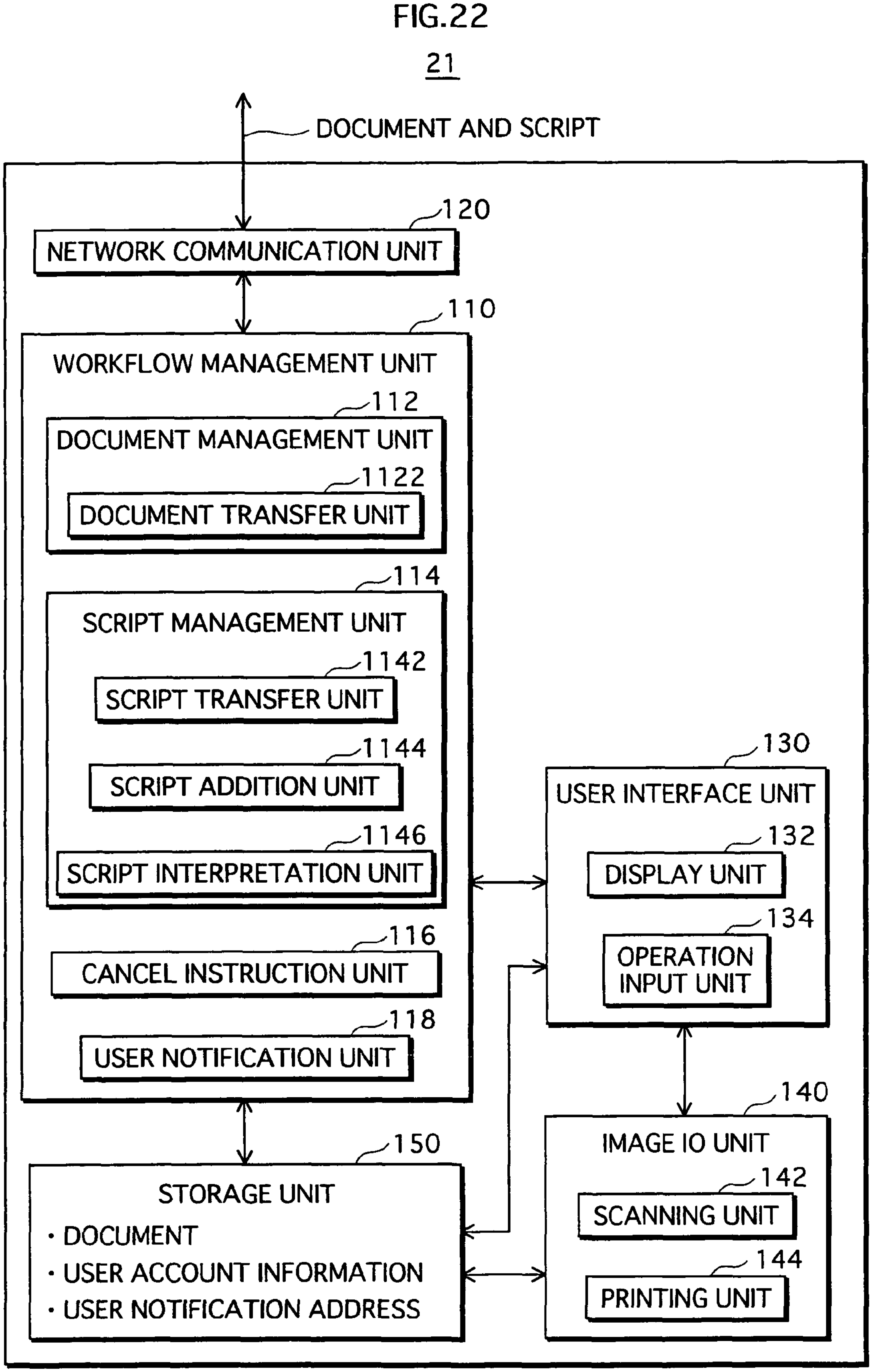
FIG. 22 is a functional block diagram of an MFP 21.

FIG. 22 is a functional block diagram of an MFP 21. Since the MFP 21 has basically a similar construction to the MFP A10 (see FIG. 2), the same constituent elements have been given the same characters, and their description is omitted.

A workflow management unit 110 includes a document management unit 112, a script management unit 114, a user notification unit 118, as well as a cancel instruction unit 116.

When a remand is received by the addressed apparatus, the cancel instruction unit 116 transmits a cancel instruction which instructs apparatuses downstream of the receiving apparatus to cancel execution of actions. The cancel instruction unit 116 also receives cancel instructions from other apparatuses.

Descriptions of the MFP 11, the MFP 31, the MFP 32, the MFP 41, and the MFP 42 are omitted since their constructions are similar to the MFP 21.

Figure 23:
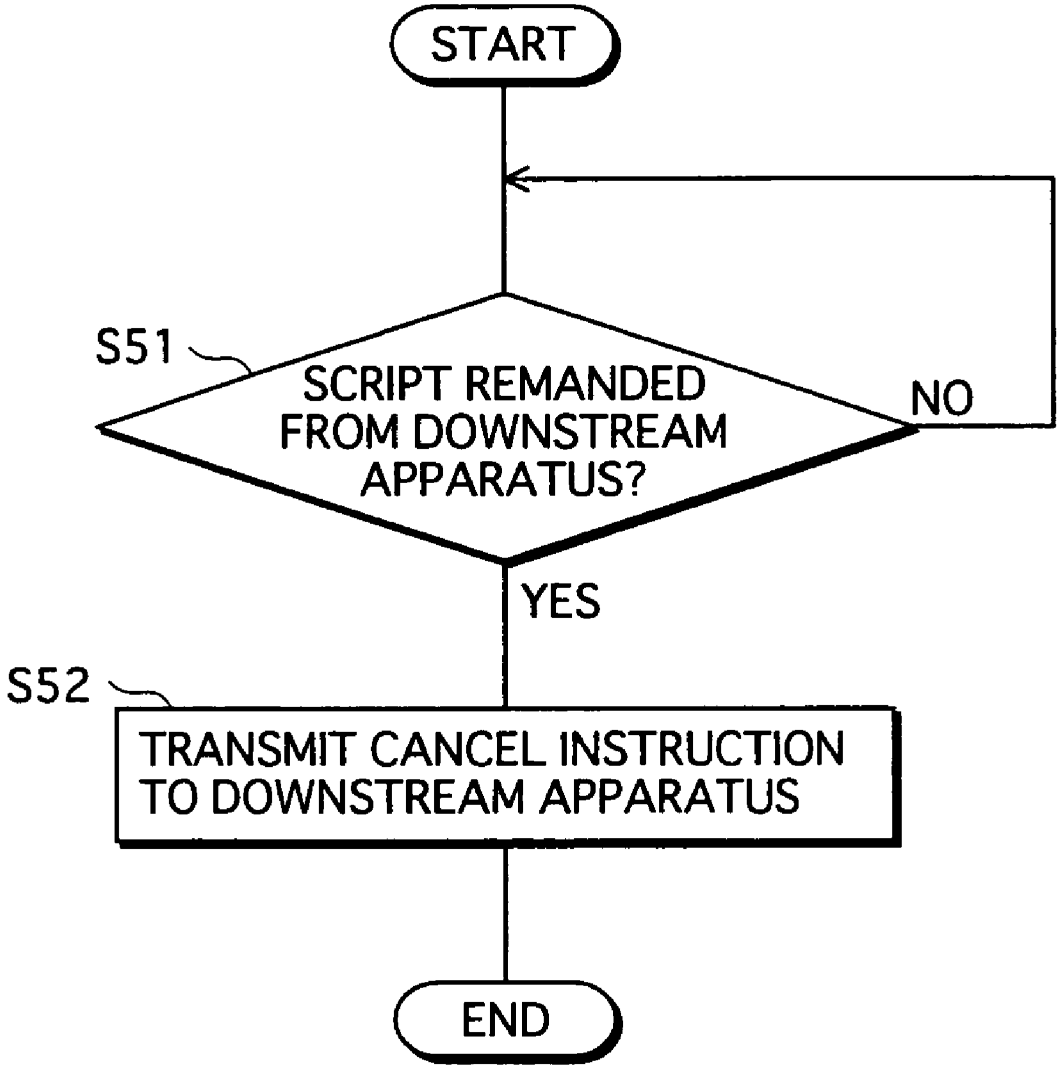
FIG. 23 is a flowchart showing processing content executed by an MFP 11, the MFP 21, an MFP 31, an MFP 32, an MFP 41, and an MFP 42 if one of the above receives a remand.

FIG. 23 is a flowchart showing processing content executed by an MFP 11, the MFP 21, an MFP 31, an MFP 32, an MFP 41, and an MFP 42 if one of the above receives a remand.

When an apparatus is remanded a script from a downstream apparatus (S51: YES), the apparatus interprets the remanded script, and transmits a cancel instruction to downstream apparatuses (S52).

Note that if the apparatus is located at the point of a split, as with the MFP 21, the apparatus interprets the script and transmits the cancel instruction to apparatuses (MFP 32 and MFP 42) corresponding to the branch different from the branch (MFP 31 and MFP 41) which includes the remand-source apparatus. The possibility of actions being needlessly continued in the MFP 31 and MFP 41 is therefore considered to be low.

Figure 24:
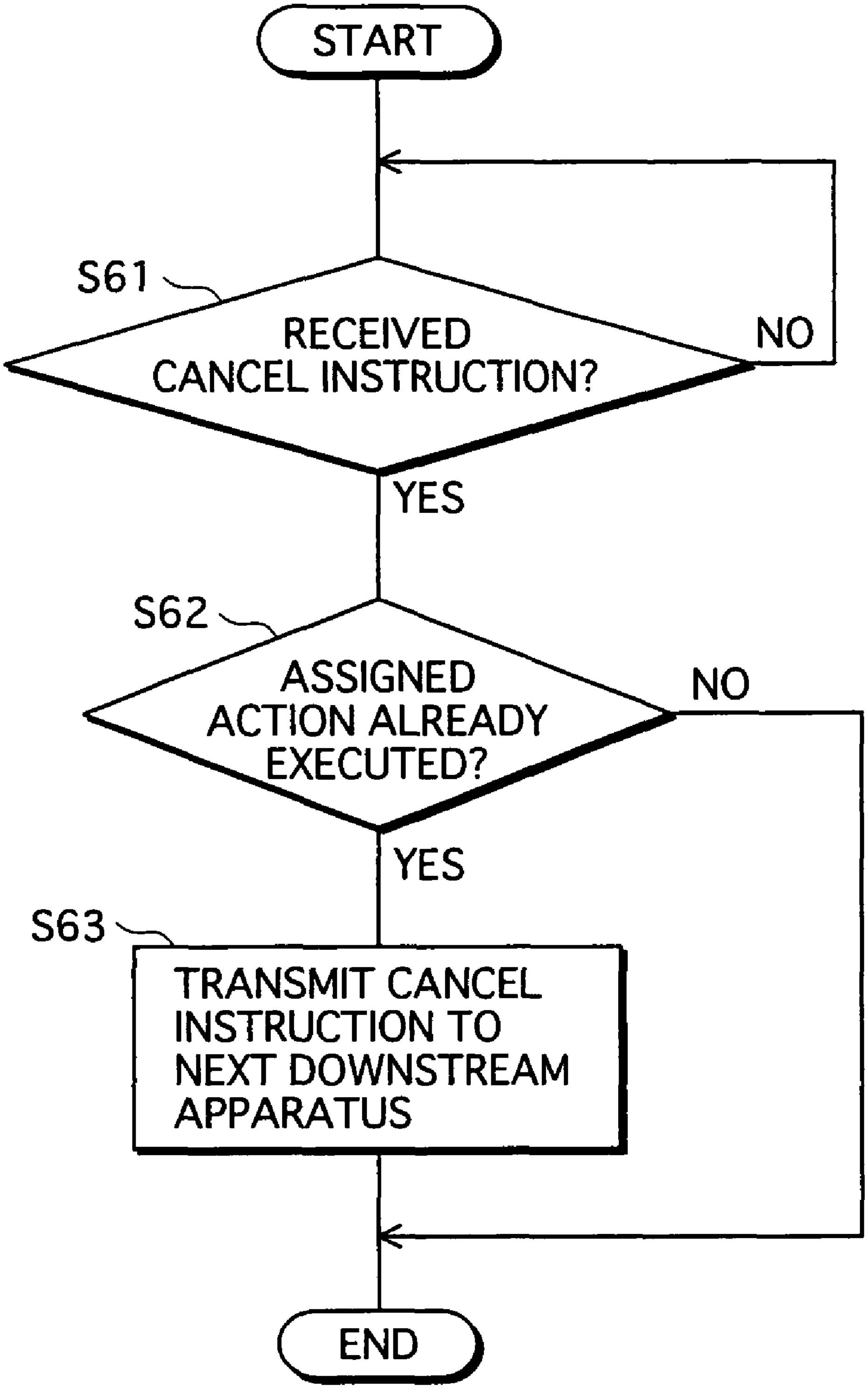
FIG. 24 is a flowchart showing processing content executed by the MFP 11, the MFP 21, the MFP 31, the MFP 32, the MFP 41, and the MFP 42 if one of the above receives a cancel instruction.

FIG. 24 is a flowchart showing processing content executed by the MFP 11, the MFP 21, the MFP 31, the MFP 32, the MFP 41, and the MFP 42 if one of the above receives a cancel instruction.

When the cancel instruction is received (S61: YES), the MFP judges whether its assigned action has already been executed (S62). This judgment can be implemented by, for example, storing a history of executed actions in the MFPs.

If the action has been executed (S62: YES), the MFP transmits the cancel instruction to the next downstream apparatus (S63). Here, it is possible to implement judgment of downstream apparatuses by, for example, including pathway information in the cancel instruction.

Other Variations (1) The network image processing system pertaining to the present invention can be applied in a network image processing method.

(2) The script and the document are basically described separately in the first embodiment, although the two need not be necessarily exclusive or alternative. They may be handled as a single unit by embedding the script in the document for example.

In FIG. 19, the script transmitted by the MFD D40 may be considered to be a "document" including information which indicates a remand instruction.

(3) Although not particularly mentioned in detail in the first embodiment, the document may be layer-managed per unit of action.

(4) Although not particularly mentioned in detail in the first embodiment, other information may be included in the script.

For example, it is conceivable to include information in the script for improving security, particularly information related to printing security.

Specifically, settings related to the print page count (for example, a maximum value setting for how many pages may be printed), the print environment (for example, a print instruction initiator, a print instruction apparatus (IP address), a print-permit period, etc.), the print mode (for example, a higher security mode setting), and the like may be described in the script, where printing is only authorized if the set conditions are satisfied.

(5) The script is XML formatted in the first embodiment, although a script in Visual Basic™, JavaScript™, or other format may be used.

(6) In the first embodiment, the present invention has a structure which displays the documents as thumbnails per action, as shown in FIG. 15, although alternatively or additionally, the documents may be displayed as a list of users-in-charge, action execution apparatuses, or action execution times.

(7) In the first embodiment, the script is transferred between the apparatuses (MFP A10, MFP B20, MFP C30, MFP D40, see FIGS. 7 and 8) which constitute the workflow, although the present invention may have a system structure using a management server which stores workflow management information associated with this script and centrally manages the workflow.

In such a system construction, an action execution command is transmitted from the management server to an execution apparatus, and a document generated by execution of the action is transmitted from the execution apparatus to the management server. In a case of a remand, remand information indicating a remand instruction is transmitted from the remand-source apparatus, and this information is transmitted to the remand-destination apparatus via the management server.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A network image processing system in which a plurality of networked apparatuses execute independent actions on a target document to complete the target document in stages, wherein the target document is transmitted and received between the apparatuses, each of the apparatuses comprising:

a receiving unit for receiving the target document and a first script from an upstream apparatus, the target document including all portions of the target document generated by upstream apparatuses, the first script including a listing of actions which indicate document processing content, sequence information which indicates an execution sequence of the actions including a split at a predetermined point in the execution sequence, and apparatus information which specifies the apparatuses to which the actions are assigned;

an execution unit executing an assigned action to generate a portion of the target document;

a correlation unit adding, to the first script, location information that indicates a network location of the execution unit that corresponds to the executed assigned action;

a transfer unit appending the portion of the target document generated by the execution unit to the target document received from the upstream apparatus, and transferring the first script and the document with the portion of the target document generated by the execution unit and all portions generated by upstream apparatuses to a downstream apparatus, wherein the appended portion and all portions generated by upstream apparatuses collectively constitute a separate stage of completion of the target document, wherein there is a separate stage of completion of corresponding scope for each apparatus, such that there is a separate stage of completion for every appended portion of the target document comprising that specific appended portion and all portions before that specific appended portion;

a display unit separately displaying each stage of completion of the target document;

a reception unit receiving, from a user, a selection of one of the separate stages of completion;

a remand unit remanding, in accordance with the location information corresponding to the portion of the target document for which the selection has been received, the document to the networked apparatus which appended the portion of the document for which the selection has been received;

the remand unit transmitting or receiving a second script that defines document handling, wherein the second script is destined to the networked apparatus to which the document has been remanded in accordance with location information corresponding to the portion of the document for which a selection has been received by the reception unit, wherein the second script includes remand information indicating a remand of the script and information specifying the apparatus that selection has been received as a remand-source;

a cancel instruction unit; and a position judgment unit judging, based on the apparatus information and the sequence information included in the first script, whether the apparatus is positioned at the predetermined point in the execution sequence indicated in the first script, and if the judgment is affirmative, the cancel instruction unit transmits a cancel instruction to an apparatus on a different branch from the remand-source apparatus that is to execute a subsequent action according to the sequence information indicated in the first script.

2. The network image processing system of claim 1, wherein the reception unit receives a selection from a user in charge of an action.

3. The network image processing system of claim 1, wherein the transfer unit transfers the first script with the document to the apparatus that is to execute a subsequent action according to the sequence information.

4. The network image processing system of claim 1, wherein the actions include a manual action requiring a user operation, the first script includes address information specifying an address of a user in charge of the manual action, and each of the apparatuses further includes a notification unit, if the first script includes the remand information and the assigned action is the manual action, sending, to the address specified in the address information included in the first script, a notification of the remand.

5. The network image processing system of claim 1, wherein the network image processing system includes a terminal apparatus that assists in execution of the actions assigned to the apparatuses, and the script addition unit adds, after action execution, location information indicating the terminal apparatus that assisted in execution of the action to the first script.

6. The network image processing system of claim 1, wherein the first script is in XML format.

7. A network image processing apparatus included in a network image processing system in which a plurality of the network image processing apparatuses that are networked execute independent actions on a target document to complete the target document in stages, wherein the target document is transmitted and received between the apparatuses, comprising:

a receiving unit for receiving the target document and a first script from an upstream apparatus, the target document including all portions of the target document generated by upstream apparatuses, the first script including a listing of actions which indicate document processing content, sequence information which indicates an execution sequence of the actions including a split at a predetermined point in the execution sequence, and apparatus information which specifies the apparatuses to which the actions are assigned;

an execution unit executing an assigned action to generate a portion of the target document;

a correlation unit adding, to the first script, location information that indicates a network location of the execution unit that corresponds to the executed assigned action;

a transfer unit appending the portion of the target document generated by the execution unit to the target document received from the upstream apparatus, and transferring the first script and the document with the portion of the target document generated by the execution unit and all portions generated by upstream apparatuses to a downstream apparatus, wherein the appended portion and all portions generated by upstream apparatuses collectively constitute a separate stage of completion of the target document, wherein there is a separate stage of completion of corresponding scope for each apparatus, such that there is a separate stage of completion for every appended portion of the target document comprising that specific appended portion and all portions before that specific appended portion;

a display unit separately displaying each stage of completion of the target document;

a reception unit receiving, from a user, a selection of one of the separate stages of completion;

a remand unit remanding, in accordance with the location information corresponding to the portion of the target document for which the selection has been received, the document to the networked apparatus which appended the portion of the document for which the selection has been received;

the remand unit transmitting or receiving a second script that defines document handling, wherein the second script is destined to the networked apparatus to which the document has been remanded in accordance with location information corresponding to the portion of the document for which a selection has been received by the reception unit, wherein the second script includes remand information indicating a remand of the script and information specifying the apparatus that selection has been received as a remand-source;

a cancel instruction unit; and a position judgment unit judging, based on the apparatus information and the sequence information included in the first script, whether the apparatus is positioned at the predetermined point in the execution sequence indicated in the first script, and if the judgment is affirmative, the cancel instruction unit transmits a cancel instruction to an apparatus on a different branch from the remand-source apparatus that is to execute a subsequent action according to the sequence information indicated in the first script.

8. The network image processing apparatus of claim 7, wherein the actions include a manual action requiring a user operation, the first script includes user-in-charge information specifying a user in charge of the manual action, and the network image processing apparatus further includes: a storage unit operable to store address information per user; and a notification unit, if the first script is remanded from an apparatus that is to execute a subsequent action according to the sequence information and the assigned action is the manual action, sending, to the user in charge of the manual action at an address indicated in the address information, a notification of the remand.

9. The network image processing apparatus of claim 7, wherein if the cancel instruction is received, the cancel instruction unit transmits the cancel instruction, after the assigned action is completed, to the apparatus that is to execute a subsequent action according to the sequence information.

10. The network image processing apparatus of claim 7, further comprising a comment creation unit creating a comment for the selection, wherein the remand unit remands the created comment.

11. The network image processing apparatus of claim 10, wherein the comment creation unit uses image data scanned from a draft in creation of the comment.

12. A network image processing method used in a network image processing system in which a plurality of networked apparatuses execute independent actions on a target document to complete the target document in stages, wherein the target document is transmitted and received between the apparatuses, comprising the steps of:

receiving the target document and a first script from an upstream apparatus, the target document including all portions of the target document generated by upstream apparatuses, the first script including a listing of actions which indicate document processing content, sequence information which indicates an execution sequence of the actions including a split at a predetermined point in the execution sequence, and apparatus information which specifies the apparatuses to which the actions are assigned;

executing an assigned action to generate a portion of the target document;

adding, to the first script, location information that indicates a network location of the execution unit that corresponds to the executed assigned action;

appending the portion of the target document to the target document received from the upstream apparatus, and transferring the first script and the document with the portion of the target document and all portions generated by upstream apparatuses to a downstream apparatus, wherein the appended portion and all portions generated by upstream apparatuses collectively constitute a separate stage of completion of the target document, wherein there is a separate stage of completion of corresponding scope for each apparatus, such that there is a separate stage of completion for every appended portion of the target document comprising that specific appended portion and all portions before that specific appended portion;

displaying separately each stage of completion of the target document;

receiving, from a user, a selection of one of the separate stages of completion;

remanding, in accordance with the location information corresponding to the portion of the target document for which the selection has been received, the document to the networked apparatus which appended the portion of the document for which the selection has been received;

transmitting or receiving a second script that defines document handling, wherein the second script is destined to the networked apparatus to which the document has been remanded in accordance with location information corresponding to the portion of the document for which a selection has been received during the receiving step, wherein the second script includes remand information indicating a remand of the script and information specifying the apparatus that selection has been received as a remand-source; and judging, based on the apparatus information and the sequence information included in the first script, whether the apparatus is positioned at the predetermined point in the execution sequence indicated in the first script, and if the judgment is affirmative, transmitting a cancel instruction to an apparatus on a different branch from the remand-source apparatus that is to execute a subsequent action according to the sequence information indicated in the first script.

* * * * *